United States Patent
Shibata et al.

(10) Patent No.: US 7,425,775 B2
(45) Date of Patent: Sep. 16, 2008

(54) WIND TURBINE PROVIDED WITH A CONTROLLER FOR ADJUSTING ACTIVE ANNULAR PLANE AREA AND THE OPERATING METHOD THEREOF

(75) Inventors: Masaaki Shibata, Nagasaki (JP); Yoshiyuki Hayashi, Nagasaki (JP); Toyoaki Furukawa, Nagasaki (JP); Yuuji Yatomi, Nagasaki (JP); Eiji Kato, Nagasaki (JP); Yoshinari Teramoto, Nagasaki (JP); Hisao Miyake, Nagasaki (JP); Koshi Hayakawa, Nagasaki (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 495 days.

(21) Appl. No.: 11/123,131

(22) Filed: May 6, 2005

(65) Prior Publication Data

US 2005/0200135 A1    Sep. 15, 2005

Related U.S. Application Data

(62) Division of application No. 10/338,888, filed on Jan. 9, 2003, now Pat. No. 7,071,578.

(30) Foreign Application Priority Data

Jan. 10, 2002 (JP) ............................. 2002-003396
Jan. 11, 2002 (JP) ............................. 2002-004332
Feb. 22, 2002 (JP) ............................. 2002-046193
Sep. 13, 2002 (JP) ............................. 2002-268240
Sep. 13, 2002 (JP) ............................. 2002-268241

(51) Int. Cl.
*F03D 9/00* (2006.01)
*H02P 9/04* (2006.01)

(52) U.S. Cl. ............................... 290/55; 290/44

(58) Field of Classification Search ............... 290/55, 290/54, 44, 43; 416/1, 132 B, 11, 32, 122; 415/7, 2.1, 4.2, 907, 4.1; 60/398
See application file for complete search history.

(56) References Cited

U.S. PATENT DOCUMENTS

| | | | | |
|---|---|---|---|---|
| 2,135,887 A | * | 11/1938 | Fairey | 416/23 |
| 2,360,791 A | | 10/1944 | Putnam | 170/59 |
| 4,189,648 A | | 2/1980 | Harner | 290/44 |
| 4,366,386 A | | 12/1982 | Hanson | 290/44 |
| 4,426,192 A | | 1/1984 | Chertok et al. | 416/1 |
| 4,533,297 A | * | 8/1985 | Bassett | 416/132 B |

(Continued)

FOREIGN PATENT DOCUMENTS

| | | | |
|---|---|---|---|
| JP | 07-42664 | | 2/1995 |
| JP | 9-79127 | | 3/1997 |
| JP | 09079127 A | * | 3/1997 |
| JP | 2001032760 A | * | 2/2001 |
| JP | 2003206847 A | * | 7/2003 |

*Primary Examiner*—Julio C. Gonzalez
(74) *Attorney, Agent, or Firm*—Edwards Angell Palmer & Dodge LLP

(57) ABSTRACT

A wind turbine capable of varying active annular plane area by composing such that blades are attached to a cylindrical rotor movable in the radial direction of the rotor, the blades being reciprocated in the radial direction by means of a blade shifting mechanism connected to the root of each blade, or the blade itself is divided so that the outer one of the divided blade is movable in the radial direction. With this construction, the wind turbine can be operated with a maximum output within the range of evading fatigue failure of the blades and rotor by adjusting the active annular plane area in accordance with wind speed.

3 Claims, 28 Drawing Sheets

U.S. PATENT DOCUMENTS

| | | | |
|---|---|---|---|
| 4,710,101 A * | 12/1987 | Jamieson | 416/32 |
| 5,285,112 A * | 2/1994 | Mann | 290/44 |
| 6,441,507 B1 | 8/2002 | Deering et al. | 290/44 |
| 6,726,439 B2 | 4/2004 | Mikhail et al. | 415/4.1 |
| 6,752,595 B2 | 6/2004 | Murakami | 416/87 |
| 2003/0044274 A1 * | 3/2003 | Deane et al. | 416/1 |
| 2003/0223868 A1 | 12/2003 | Dawson et al. | 416/1 |
| 2003/0230898 A1 | 12/2003 | Jamieson et al. | 290/55 |

* cited by examiner

WIND TURBINE PROVIDED WITH A CONTROLLER FOR ADJUSTING ACTIVE ANNULAR PLANE AREA AND THE OPERATING METHOD THEREOF

This application is a Divisional application of U.S. patent application Ser. No. 10/338,888, filed Jan. 9, 2003 now U.S. Pat. No. 7,071,578.

BACKGROUND OF THE INVENTION

1. Field of the Invention

The present invention is a wind turbine generator and relates to a wind turbine having a plurality of blades attached to a rotor, the rotating force generated by allowing wind force to act on the blades being transmitted to the output shaft of the rotor, wherein a controller of an active annular plane area is provided for making it possible to change the active annular plane area of the wind turbine by reciprocating each of the blades in a radial direction or by slanting the rotor and the operating method thereof.

2. Description of the Related Art

A wind turbine power plant having high capacity of generating electric power by installing a plurality of wind turbine electric power generator units, each of which utilizes the rotating force generated by applying wind force to a plurality of blades attached to a rotor to drive a generator via the wind turbine shaft, is constructed at high elevation such as the top of a hill or mountain or at a place where high wind velocity can be received, such as above the sea.

The wind turbine apparatus used for driving an electric generator or other purposes is constructed, as shown in FIG. 1 of patent document 1 (Japanese Patent Application Publication No. 5-60053) and In FIG. 1 of patent document 2 (Japanese Patent Application Publication No. 5-60053)), such that a plurality of blades are attached to the periphery of a rotor head and the rotating force generated by wind force is transmitted to the turbine shaft via the rotor head. Desired or determined electric power generation is maintained by changing the pitch angle of the blades attached to the rotor in accordance with the wind speed and required electric power while controlling to adjust the blade pitch angle to the angle optimal for the wind speed blowing when the apparatus is in operation.

In the wind turbine of FIG. 1 of patent document 3 (Japanese Patent Application Publication No. 2001-99045), blades are attached to a rotor head such that the blades are supported for rotation via bearings fixed to the rotor head, bevel gear mechanism is provided inside the rotor head to be driven by a servomotor. The pitch angle of the blades is changeable by rotating the blades relative to the rotor head by the servomotor via the bevel gear mechanism.

The output power of the wind turbine generated by the action of wind is about proportional to active annular plane area, i.e., the area of the annular plane formed between the circumscribed circle of the blade tips and the inscribed circle of the blade roots.

$$S=\pi(L^2-I^2) \tag{1}$$

where S is active annular plane area, L is radius of the circumscribed circle, and I is radius of the inscribed circle.

In order to increase the output power of a wind turbine, it is required that radius L is increased or the difference between L and I, that means the length of the blade is increased.

The power $P_w$ that the wind passing through active annular plane area S has, is $$P_w=k \cdot S \cdot V^3 \tag{2}$$

where V is wind speed, and k is air density divided by 2.

As wind speed depends on weather conditions at the location of the wind turbine, the output of the wind turbine, that is the electric power generated in the case of wind turbine electric generator, can be increased by increasing the active annular plane area.

However, in the case where the active annular plane area is increased for increasing output power, the rotating components such as the blades and rotor are more likely to be broken by fatigue failure resulting from being subjected to repeated excessively fast wind speed V of a gust of wind, etc., which sometimes occurs according to weather conditions, although the output is increased.

With the prior art disclosed in patent documents 1 and 2, because the blades are fixed to the rotor head of a somewhat larger diameter than the rotor shaft, it is difficult to design a longer blade, that is, to increase radius L, so that there is a limit for increasing the output of a wind turbine. Further, when blade length is increased to the maximum to increase active annular plane area for increasing the output of the wind turbine, the rotating components such as the blades and rotor tend to be broken by fatigue failure due to repeated occurrence of a gust of wind, etc., of excessively increased speed.

The wind turbine of patent document 3 has a means for changing blade pitch angle by rotating the blades relative to the rotor head, however, the active annular plane area is not variable but constant, and there remains also the problem that the rotating components such as the blades and rotor tend to be broken by fatigue failure resulting from being subjected to repeated excessively increased speed of a gust of wind, etc.

SUMMARY OF THE INVENTION

The first objective of the present invention is to provide a wind turbine with which an active annular plane area of the blades is variable corresponding to wind speed by changing the radial positioning of the blades and the output of the wind turbine can be maintained at a maximum while avoiding the occurrence of fatigue failure.

The second objective of the present invention is to provide a wind turbine with which an active annular plane area of the blades is variable corresponding to wind speed by changing the effective length of blades and the output of the wind turbine can be maintained at a maximum while avoiding the occurrence of fatigue failure.

The third objective of the present invention is to provide a wind turbine with which an active annular plane area of the blades is variable corresponding to operating conditions, such as wind speed, etc., and at the same time corresponding to the stress of the rotating components of the wind turbine by changing the effective length of blades and the output of the wind turbine can be maintained at a maximum while avoiding the occurrence of fatigue failure.

The fourth objective of the present invention is to provide a wind turbine which is provided with an active annular plane area adjusting device which makes it possible to change an active annular plane area corresponding to the speed of the wind in the direction of the axis of rotation of the rotor head of the wind turbine by connecting the blades to the rotor head by means of rotatable connecting elbows and the output of the wind turbine can be maintained at a maximum while avoiding the occurrence of fatigue failure.

The fifth objective of the present invention is to provide a wind turbine with which an active annular plane area of the blades is variable corresponding to wind speed by tilting the blades toward the axis of rotation and the output of the wind turbine can be maintained at a maximum while avoiding the occurrence of fatigue failure.

To attain the objectives, the wind turbine is composed as follows.

The first means of the present invention is a wind turbine with an active annular plane area control mechanism comprising a plurality of blades attached to a rotor for transmitting the wind force acting on the blades to the output shaft of the wind turbine connected to the rotor, wherein said rotor is formed in a cylindrical shape, said blades are attached to said rotor movable in a radial direction of the rotor, a blade shifting mechanism is connected to the roots of said blades for reciprocating said blades in the radial direction, and an active annular plane area is changeable by moving said blades in the radial direction through said blade shifting mechanism.

The rotor of said wind turbine has preferably radial fit holes located at an equal spacing in the circumferential direction, said blades are received in said radial fit holes for reciprocation, and said blade shifting mechanism is provided in the hollow of said rotor.

Said wind turbine is preferably provided with a wind speed detector for detecting the speed of the wind acting on said blades and a control device which receives the detected wind speed from said wind speed detector, calculates a desired active annular plane area and the radial position corresponding to said active annular plane area on the basis of said detected wind speed, and outputs the result to said blade shifting mechanism.

Said blade shifting mechanism preferably comprises a plurality of screw bars received for rotation in radial holes provided in the cylindrical wall of said rotor, sleeves each of which is engaged with each of the screw bars, links each of which connects each of said links and said blades, pinions each of which is fixed to each of said screw bars at the inner side part thereof, and a driving gear meshing with said pinions and driven by a driving device such as a motor; and said blades are reciprocated in the radial direction through the expansion or contraction of said links resulting from the shifting of said sleeves by the rotation of said screw bars when said driving gear is rotated by said driving device.

Further, said blade shifting mechanism preferably comprises a supporting element located in the center part of said rotor; pairs of links capable of being expanded or contracted, each pair connecting the root of each blade to said supporting element, screw bars each connecting one side of each of said pairs of links, and driving devices such as motors for rotating said screw bars; and the radial position of said blades is changeable by expanding or contracting said pairs of links through rotating said screw bars by said driving devices.

Yet further, said blade shifting mechanism preferably comprises two rings, an outer ring and an inner ring, provided concentrically with the center axis of said rotor rotatable in the direction contrary to each other, pairs of links capable of being expanded or contracted, each pair connecting the root of each blade to the outer ring with one of the pair and to the inner ring with the other of the pair, a driving device for rotating said two rings in the direction contrary to each other, and a supporting element located in the center part of said rotor and supports one of said rings; and said blades can be reciprocated in the radial direction by expanding or contracting said pairs of links through rotating said rings in the direction contrary to each other.

Still further, said blade shifting mechanism preferably comprises a slider received in a slider receiver fixed to the rotor 2 for sliding in the radial direction of the rotor, the slider having a screw thread hole directed in the radial direction, links each of which has a curved convex surface at an end thereof to be engaged in a convex of curved surface formed in said slider receiver to be supported for swinging, the other end having an elongated hole through which the link is connected to the lower end part of the blade via a pin fixed to said lower part, a screw bar engaged with said screw thread hole of said slider, and a driving device such as a motor for rotating said screw bar; and the blades can be reciprocated in the radial direction via said elongated hole and said pin engaging in said hole by moving said slider in the radial direction in said slider receiver through rotating said screw bar by the rotation of said driving device.

The second means of the present invention is an operating method of the wind turbine with an active annular plane area control mechanism comprising a plurality of blades attached to a rotor for transmitting the wind force acting on the blades to the output shaft of the wind turbine connected to the rotor, wherein the speed of the wind acting on the wind turbine is detected, and the blades attached to the rotor capable of being moved in the radial direction of the rotor are moved in radial outward directions to increase an active annular plane area as the detected wind speed decreases and the blades are moved in radial inward directions to decrease the active annular plane area as the detected wind speed increases.

The third means of the present invention is a wind turbine with an active annular plane area control mechanism of a darrieus type wind turbine which has supporting elements provided along a vertical wind turbine shaft and a stage or a plurality stages of a plurality of sets of blades, each of which is supported by said supporting elements at both ends thereof and located along said vertical wind turbine shaft, said wind turbine shaft being rotated by the aerodynamic lift effected by the wind acting on said blades, wherein said supporting elements are capable of being shifted in the radial direction perpendicular to said wind turbine shaft, a blade shifting mechanism is provided for changing the radial position of said set of blades by shifting said supporting elements in the radial direction, by which the radius of rotation of said blades can be changed.

Said wind turbine of the third means is preferably provided with a wind speed detector for detecting the speed of the wind acting on said wind turbine and a control device which calculates the desired active annular plane area and the shift amount to realize said desired active annular plane area and allows the blades to be shifted in radial outward directions by shifting said supporting elements through said blade shifting mechanism in order to increase the active annular plane area as said detected wind speed decreases, allows the blades to be shifted in radial inward directions in order to decrease the active annular plane area as said detected wind speed increases.

Said blade shifting mechanism in the third means preferably comprises screw bars erected upright parallel to said vertical wind turbine shaft, each screw bar having right-hand and left-hand screw thread parts cut by turns along the bar, one or a plurality of pairs of shifting elements, one of the pair being engaged with the right-hand or left-hand threads of the two screw bars and the other being engaged on the contrary with the left-hand or right-hand threads of the two screw bars so that the pair of the shifting elements move in the direction contrary to each other by the rotation of said screw bars in the same direction, pairs of links each for connecting each supporting element to each of the pair of shifting elements, and a driving device for rotating said screw bars; and the blades can be shifted in the radial direction by shifting said supporting elements in the radial direction through allowing the pair of shifting elements to move in the direction contrary to each other by rotating said screw bars in the same direction by said driving device, said supporting elements being shifted in the radial direction by means of said pair of links connecting itself to the pair of shifting elements.

It is preferable in the third means that a driving device is connected to an end side of one of said screw bars and said shifting elements engaging with said screw bars are moved simultaneously.

The fourth means of the present invention is an operating method of the wind turbine with an active annular plane area control mechanism of a darrieus type wind turbine which has supporting elements provided along a vertical wind turbine shaft and a stage or a plurality stages of a plurality of sets of blades each of which is supported by said supporting elements at both ends thereof and located along said vertical wind turbine shaft, said wind turbine shaft being rotated by the aerodynamic lift effected by the wind acting on said blades, wherein the wind turbine is constructed so that the radial position of the blades is changeable by shifting the supporting elements in the radial direction perpendicular to the vertical turbine shaft, the speed of the wind acting on the blades is detected, and the blades are moved in radial outward directions by means of said supporting elements to increase the active annular plane area as the detected wind speed decreases and the blades are moved in radial inward directions to decrease the active annular plane area as the detected wind speed increases.

According to the first to fourth means, wind speed is detected by the wind speed detector and inputted to the controller. In the controller, relations between wind turbine output P, wind speed V, and active annular plane area S are set beforehand, and a relation between the limit wind speed with which fatigue failure occurs in the rotating components such as the blades and rotor and active annular plane area. The controller calculates an optimal active annular plane area corresponding to the detected wind speed when the detected wind speed is inputted, and the result is outputted to the driving device of the blade shifting mechanism.

Each blade is moved in the radial direction through the blade shifting mechanism guided by radial holes provided in the cylindrical wall of the rotor or in the darrieus type wind turbine the radial position of each blade can be changed by moving the supporting elements supporting each blade in the radial direction and the blades are kept in the position with which the active annular plane area is equal to said calculated optimal active annular plane area.

By this, it is possible that the blades are shifted in radial outward directions by shifting said supporting elements through said blade shifting mechanism in order to increase the active annular plane area as said detected wind speed decreases, and they are shifted in radial inward directions in order to decrease the active annular plane area as said detected wind speed increases. Therefore, the wind turbine can be operated with the radial position of the blades, with which the output as high as possible is obtainable while evading the occurrence of fatigue failure of the rotating components such as the blades and rotor under the present wind speed.

Accordingly, by the means mentioned above, the wind turbine can be operated while always automatically controlling blade length so that the occurrence of fatigue failure of the rotating components, such as the blades and rotor, is reduced, and at the same time the wind turbine is operated with the optimal active annular plane area which ensures the maximum output of the wind turbine in the range capable of evading the fatigue failure. Accordingly, the operation of the wind turbine is possible with the optimal maximum output with elongated fatigue life of the rotating elements such as the blades and rotor.

The fifth means of the present invention is a wind turbine with an active annular plane area control mechanism comprising a plurality of blades attached to a rotor for transmitting the wind force acting on the blades to the output shaft of the wind turbine connected to the rotor, wherein each of said blades is configured so that blade length can be changed in the total length of the blade or in a certain length from the middle up to the tip of the blade, a blade length adjusting mechanism is provided for adjusting the blade length of each of the blades, and the active annular plane area is changeable by changing the radial position of the blades relative to the rotor by said blade length adjusting mechanism.

Each of said blades is preferably formed in a bellows shape expandable and contractible in the radial direction of the rotor, a plurality of air chambers to which air is supplied or from which air is exhausted being formed inside said bellows-shaped blade continuously in the direction of blade length, and said blade length adjusting mechanism is composed of an air supply device for producing pressurized air and an air tube for supplying the pressurized air to each of said air chambers, the tube connecting said air supply device to each air chamber and being movable in the blade length direction as said bellows-shaped blade expands or contracts.

It is preferable in the fifth means that there are provided air valves attached to said air tube for opening or closing outlets of the air into each of said air chambers and an air control device for controlling the opening and closing of said air valves and the operation of said air supply device.

It is also preferable that there are provided a flexible string, such as wire connected to the top of the blade, and a flexible string driving device for expanding or contracting the blade by drawing out or in the flexible string in the blade length direction to change the blade tip diameter.

Further, it is preferable that each of said blades is divided into a variable length blade part and a blade body fixed to the rotor and connecting to the root of said variable length blade part, said variable length blade part is supported by said blade body capable of being tilted around the supporting shaft of the variable length blade part, and said blade length adjusting mechanism is composed as a blade tilting mechanism for tilting said variable length blade part around said supporting shaft by a driving device by means of a link mechanism.

Yet further, it is preferable that each of said blades is divided into a variable length blade part and a blade body fixed to the rotor and connecting to the root of said variable length blade part, said variable length blade part is received in the guide hole of said blade body capable of being moved in the direction of blade length, and said blade length adjusting mechanism is composed as a blade reciprocating device for reciprocating the variable length blade part guided along said guide hole by a reversible driving device, such as a reversible motor, in order to change the blade tip diameter.

Still further, each of said variable length blade parts has preferably a rack fixed to the lower end thereof, and said blade reciprocating device is composed such that a pinion which meshes with said rack is fixed to the output shaft of said reversible driving device to convert the rotating motion of the reversible driving device to the reciprocating motion of the variable length blade part.

Yet still further, each of said variable length blade parts has preferably a shaft with female screw thread fixed to the lower end thereof, and said blade reciprocating device is composed such that a screw bar which engages in the female screw thread of said shaft is fixed to the output shaft of said reversible driving device to convert the rotating motion of the reversible driving device to the reciprocating motion of the variable length blade part.

Further in the fifth means, each of said blades is divided into a variable length blade part and a blade body fixed to the rotor and connecting to the root of said variable length blade part, said variable length blade part is composed of a front core made of hard material such as a metal pipe extended downward in the direction of blade length to form an actuating shaft part, a rear core made of wire of soft material, and a blade shell made of flexible material defining a blade profile between said front core and rear core, said actuating shaft part of the front core is received for sliding in the direction of blade length in a bearing hole provided in the blade body, and said blade reciprocating device is composed as a blade reciprocating device for reciprocating said variable length blade part through reciprocating said actuating shaft part of the front core by means of a reversible driving device such as a reversible motor.

According to the fifth means, an active annular plane area can be adjusted to an optimal area corresponding to wind speed even during the operation of the wind turbine by varying the tip diameter of blades by changing the effective blade length through shifting the blades in the radial direction of the rotor by means of the blade length adjusting mechanism, or by extending or contracting the blade itself in the blade length direction.

By this, it is possible to operate the wind turbine so that an output as high as possible is obtained while evading the occurrence of fatigue failure of the rotating components, such as the blades and rotor, under the present wind speed by adjusting the effective length of each of the blade itself so that the blade tip diameter is increased by increasing the effective blade length to increase active annular plane area as wind speed decreases, on the other hand the blade tip diameter is decreased by decreasing the effective length to decrease active annular plane area as wind speed increases.

Therefore, by the fifth means, the wind turbine can be operated while always automatically controlling blade length so that the occurrence of fatigue failure of the rotating components such as the blades and rotor, and at the same time the wind turbine is operated with the optimal active annular plane area which insures a maximum of the wind turbine output while avoiding fatigue failure.

Accordingly, the operation of wind turbine is possible with an optimal maximum output with elongated fatigue life of the rotating elements such as the blades and rotor.

Further, the blade length varying mechanism is constructed light in weight and can be provided inside the blade, so an active annular plane area is variable without accompanying the increase in the weight of blade.

Further, according to the fifth means, active annular plane area can be changed by changing the effective blade length by supplying or exhausting air to or from each of the independent air chamber formed continuously in the direction of the length the blade formed in a bellows shape by opening or closing air valves through an air control device.

The blade tip diameter can be varied by extending or contracting said blade through drawing out or in the flexible string such as wire connected to the top of the blade by the flexible string driving device.

According to the fifth means, the projected area of the surface of revolution of the blade in the direction of the axis of rotation of the rotor, i.e., active annular plane area is changeable by changing the tilt angle of each of the variable blade length parts through swinging each variable blade length part which is supported at the root part thereof for rotation by the supporting shaft fixed to the blade body via the link mechanism.

Further, according to the fifth means, an active annular plane area is changeable by changing the blade tip diameter by reciprocating each variable length blade part fit for sliding in the guide hole of each blade body via a rotation-reciprocation converting mechanism such as pinion-rack mechanism or screw bar-nut mechanism through the rotation of the reversible driving device such as a reversible motor.

Further, according to the fifth means, the active blade tip diameter is changeable by reciprocating each variable length blade part by sliding the actuating shaft which is the extended part of the front core of the variable length blade part and fit for sliding in the guide hole of each blade body via a rotation-reciprocation converting mechanism, such as pinion-rack mechanism, through the rotation of the reversible driving device, such as a reversible motor.

Further, according to the present invention, each of the variable length blade parts composed of a front core made of wire, a rear core made of soft wire, and a blade shell made of flexible material defining blade profile between the front core and rear core, so that the variable length blade part is made to be light in weight, and in addition to that, as the blade shell is made of flexible material, the variable length blade part can be folded, which results in ease of transportation.

The sixth means of the present invention is a wind turbine with an active annular plane area control mechanism comprising a plurality of blades attached to a rotor for transmitting the wind force acting on the blades to the output shaft of the wind turbine connected to the rotor, wherein each of said blades is divided into a variable length blade part and a blade body fixed to the rotor and connecting to the root of said variable length blade part, and there are provided operating conditions detectors for detecting the operating conditions of the wind turbine, a blade length controller for comparing each of the detected signals of the operating conditions inputted from said operating conditions detectors with each of the predetermined permissible values of operating conditions and calculating the amounts of active annular plane area and blade length to be adjusted for optimal operation based on the result of comparisons, and a blade length adjusting mechanism for changing blade length based on the calculated blade length inputted from said blade length controller.

It is preferable that said operating condition detectors include at least one among a wind speed detector for detecting the speed of the wind acting on the wind turbine, a rotation speed detector for detecting the rotation speed of a rotating component of the wind turbine including the rotor, and a load detector for detecting the load of the wind turbine, and said blade length controller compares the signal of detected wind speed from said wind speed detector with a predetermined permissible value of wind speed, or compares the signal of detected rotation speed from said rotation speed detector with a predetermined permissible value of rotation speed, or compares the signal of detected load from said load detector with a predetermined permissible value of load, calculates the amounts of active annular plane area and blade length to be adjusted for optimal operation concerning at least one among wind speed, rotation speed, and load, and outputs the result to said blade length adjusting mechanism.

It is also preferable that a blade stress detector is provided for detecting the stress occurred in the blade, and said blade length controller is composed so that the amounts of active annular plane area and blade length to be adjusted for optimal operation are calculated based on both the result of comparison of the signal of detected blade stress with a predetermined permissible value of blade stress and the result of comparisons of the detected signals of the operating conditions with predetermined values of operating conditions and the calculation result is outputted to said blade length adjusting mechanism.

Further, it is preferable that said operating condition detectors include at least one among a wind speed detector for detecting the speed of the wind acting on the wind turbine, a rotation speed detector for detecting the rotation speed of a rotating component of the wind turbine including the rotor, and a load detector for detecting the load of the wind turbine, a blade stress detector is provided for detecting the stress occurred in the blade, and said blade length controller compares the signal of detected blade stress inputted from said blade stress detector with a predetermined permissible stress, and compares the signal of detected wind speed from said wind speed detector with a predetermined permissible value of wind speed, or compares the signal of detected rotation speed from said rotation speed detector with a predetermined permissible value of rotation speed, or compares the signal of detected load from said load detector with a predetermined permissible value of load, calculates the amounts of active annular plane area and blade length to be adjusted for optimal operation concerning at least one among wind speed, rotation speed, and load while maintaining the blade stress at or near the predetermined permissible stress, based on the result of said comparisons and outputs the result to said blade length adjusting mechanism.

The seventh means of the present invention is an operating method of the wind turbine with an active annular plane area control mechanism comprising a plurality of blades attached to a rotor for transmitting the wind force acting on the blades to the output shaft of the wind turbine connected to the rotor, each of said blades being configured so that blade length can be changed in the total length of the blade or in a certain length from the middle up to the tip of the blade, wherein the operating condition of the wind turbine is detected, the detected operating condition signals are compared with predetermined permissible values, the amounts of active annular plane area and blade length to be adjusted for optimal operation concerning the operation condition are calculated, and the blade length is changed according to the calculation result.

It is preferable in the seventh means that the blade stress is detected, the detected signal of the blade stress is compared with a predetermined permissible blade stress, the amounts of active annular plane area and blade length to be adjusted for optimal operation concerning both said operation condition and said blade stress are calculated, and the blade length is changed according to the calculation result.

According to the sixth and seventh means, each of said blades is composed such that a certain length of the blade from the middle to the tip thereof is variable and active annular plane area is changeable by changing the length of the variable length blade part by means of the blade length adjusting mechanism, the speed of the wind acting on the wind turbine is detected by the wind speed detector, the rotation speed of a rotating component including the rotor is detected by the rotation speed detector, the load (output) of the wind turbine is detected by the load detector, further the stress of the blade is detected by the blade stress detector, and the detected values are inputted to the blade length controller.

The blade length controller compares said detected wind speed with the predetermined permissible wind speed, or compares the detected rotation speed with the predetermined permissible rotation speed, or compares the detected load with the predetermined permissible load, and further compares the detected blade stress with the predetermined permissible blade stress, and calculates the active annular plane area and blade length to be adjusted based on the result of the comparisons.

Further, the blade length controller controls the blade length adjusting mechanism based on the calculated active annular plane area and blade length as follows.

When the detected wind speed is higher than the permissible wind speed, the active annular plane area is decreased by decreasing the blade length, and when the detected wind speed is lower than the permissible wind speed, the active annular plane area is increased by increasing the blade length. When the detected rotation speed is higher than the permissible rotation speed, the active annular plane area is decreased by decreasing the blade length, and when the detected rotation speed is lower than the permissible rotation speed, the active annular plane area is increased by increasing the blade length. When the detected load is higher than the permissible load, the active annular plane area is decreased by decreasing the blade length, and when the detected load is lower than the permissible load, the active annular plane area is increased by increasing the blade length. Further, when the detected blade stress is higher than the permissible blade stress, the active annular plane area is decreased by decreasing the blade length, and when the detected blade stress is lower than the permissible blade stress, the active annular plane area is increased by increasing the blade length.

By controlling the blade length through the blade length controller mentioned above, the lengths of the blades are adjusted so that the active annular plane area is optimal corresponding to the operating conditions such as wind speed, rotation speed and load of the wind turbine, and the output of the wind turbine can be always maintained at a maximum output level.

Further, according to the sixth and seventh means, as an active annular plane area can be controlled so that it is optimal for both the operating conditions such as wind speed, rotation speed and load of the wind turbine and for blade stress, the occurrence of excess blade stress of the rotating component due to sudden increase in wind speed or load is suppressed, and the occurrence of fatigue failure of said rotating components can be prevented.

Therefore, according to the sixth and seventh means, the wind turbine can be operated while always automatically controlling blade length so that the occurrence of fatigue failure of the rotating components such as the blades and rotor, and at the same time the wind turbine is operated with the optimal active annular plane area which insures a maximum of the wind turbine output while avoiding the fatigue failure. Accordingly, the operation of the wind turbine is possible with an optimal maximum output with elongated fatigue life of the rotating elements such as the blades and rotor.

The eighth means of the present invention is a wind turbine with an active annular plane area control mechanism comprising a plurality of blades attached to a rotor head for transmitting the wind force acting on the blades to the output shaft of the wind turbine connected to the rotor head, wherein each blade is attached to an end side of a connecting elbow of a certain bent angle, the other end side is attached to the periphery of the rotor head for rotation, a connecting elbow driving device is provided for rotating each of said connecting elbows, and the blades can be tilted in the direction of the axis of the rotor head to adjust active annular plane area.

It is preferable that there are provided a wind speed detector for detecting the speed of the wind acting on the blades, and a controller which calculates average wind speed during a certain period of time from the wind speed detected continuously by said wind speed detector and the tilt angle of the blades optimal for the average wind speed and controls said connecting elbow driving device so that the blades are tilted to the calculated angle.

As the operating method of the wind turbine with an active annular plane area control mechanism comprising a plurality of blades attached to a rotor head for transmitting the wind force acting on the blades to the output shaft of the wind turbine connected to the rotor head, it is preferable that the speed of the wind acting on the blades is detected, average wind speed during a certain period of time is calculated from the wind speed detected continuously by said wind speed detector, the active annular plane area optimal for the average wind speed is calculated, and the rotation angle of said connecting elbows is adjusted so that active annular plane area becomes equal to said calculated value through composing such that each blade is attached to each of a plurality of connecting elbows attached to the rotor head for rotation so that the blade is capable of being tilted in the direction of the axis of rotation of the rotor head by rotating said connecting elbow.

In the eighth means, it is preferable that said connecting elbow driving device comprises a ring gear fixed to said other end of the connecting elbow concentric with the axis of rotation thereof, a pinion meshing with the ring gear, a reversible motor for rotating the pinion, and a motor control device for controlling the rotation of the motor according to the output signal from said controller.

According to the eighth means, the speed of the wind acting on the blades is detected by the wind speed detector and inputted to the controller, and the controller calculates the average wind speed during a certain time period from the wind speed detected continuously by said wind speed detector and also calculates an active annular plane area the optimal wind turbine output for the average wind velocity from the predetermined relation between average wind speed and wind turbine output, and determines the active annular plane area based on said output.

The wind turbine is provided with the blade tilting mechanism which comprises connecting elbows to each of which is attached the blade and each of which is attached rotatably to the periphery part of the rotor head such that each blade is tilted by the rotation of each connecting elbow to change the tilt angle of the blade in order to change active annular plane area, and said controller calculates the rotation angle to realize said calculated active annular plane area and output it to the connecting elbow driving device of said blade tilting mechanism.

The connecting elbow driving device rotates the connecting elbow to change the tilt angle of the blade so that the tilt angle is equal to said calculated angle and keeps the blade at the position.

Thus, according to the eighth means, said controller allows said connecting elbow to be rotated to the position with which the blades are at right angle to the axis of rotation of the rotor head, accordingly active annular plane area is at maximum when average wind speed is lower than the predetermined lower limit value so that a maximum power is taken-in from wind. In this case, as wind speed is low, fatigue failure of the rotating components such as the blades and rotor does not occur by increasing the active annular plane area to the maximum.

When average wind speed is higher than the predetermined higher limit value, the connecting elbow is rotated to the position where the blades are tilted toward the axis of rotation of the rotor to decrease the active annular plane area in order to avoid occurrence of fatigue failure of the rotating components.

When average wind speed is between said lower limit and higher limit, the output of the wind turbine is determined according to the average wind speed and the blades are tilted to a position with which said determined power is obtained, and the wind turbine is operated with an optimal output taking into consideration fatigue failure of the rotating components.

By this, the wind turbine can be operated with the tilt angle of the blades adjusted and fixed at the position so that the output is a maximum while avoiding the occurrence of fatigue failure of the rotating components such as the blades and rotor.

Further, by changing the distance from the axis of rotation of the connecting elbow to the end face thereof for attaching the blade, the tip diameter of the blade can be changed. Therefore, the active annular plane area can be changed by preparing several connecting elbows different in said distance and only changing the connecting elbow without preparing blades of different blade length.

Further, according to the eighth means, the connecting elbow driving device can be composed so that the connecting elbows are controlled to be rotated to the rotational position determined by the controller by rotating them by the driving motor via the motor control device. Therefore, a simple and low-cost connecting elbow driving device can be obtained without using hydraulic devices operated by oil hydraulic pressure or air pressure.

Further, according to the eighth means, the adjustment of active annular plane area is possible by providing the blade tilting mechanism composed of said connecting elbow driving device and connecting elbow independently for each blade for adjusting the active annular plane area by changing the tilt angle of each blade by rotating the connecting elbow through the connecting elbow driving mechanism, and it is possible to adjust the tilt angle of each blade to an optimal position taking into consideration the output power of the wind turbine and fatigue limit of the rotating components.

As has been described above, according to the eighth means, the problem that may occur with conventional wind turbines having no adjusting means for adjusting the active annular plane area, i.e., the occurrence of fatigue failure of the rotating components such as the blade and rotor due to excessive high speed wind sometimes experienced by a gust of wind is prevented, and the wind turbine can be operated with a maximum output while avoiding the occurrence of fatigue failure of the rotating components such as the blades and rotor by adjusting active annular plane area by changing the tilt angle of the blades through changing the rotation angle of each connecting elbow according to the speed of the wind acting on the blades.

Therefore, according to the eighth means, the wind turbine can be operated while always automatically controlling blade length so that the occurrence of fatigue failure of the rotating components such as the blades and rotor and at the same time with the optimal active annular plane area which insures a maximum of the wind turbine output within the range capable of evading the fatigue failure. Accordingly, the operation of wind turbine is possible with an optimal maximum output with elongated fatigue life of the rotating elements such as the blades and rotor.

The ninth means of the present invention is a wind turbine with an active annular plane area control mechanism comprising a plurality of blades attached to a rotor head for transmitting the wind force acting on the blades to the output shaft of the wind turbine connected to the rotor head, wherein a blade tilting mechanism is provided for tilting the blades in the direction of the axis of rotation of the rotor head to change the active annular plane angle.

It is preferable that there are provided a wind speed detector for detecting the speed of the wind acting on the blades, and a controller which calculates average wind speed during a certain period of time from the wind speed detected continuously by said wind speed detector and the tilt angle of the blades optimal for the average wind speed and controls said blade tilting mechanism so that the blades are tilted to the calculated angle.

It is also preferable that said blade tilting mechanism comprises a fluid pressure actuator which is fixed to the rotor head so that the output shaft thereof moves in the direction of the axis of rotation of the rotor head, and a plurality of blade link each of which is supported via the supporting shaft fixed to the rotor head for swinging, an end part of each link being connected to the output shaft of said fluid pressure actuator and the other end being connected to each blade, and the tilt angle of the blades can be changed by swinging said blade link around said supporting shaft through the reciprocation of the output shaft of said fluid pressure actuator.

Further, it is preferable that said blade tilting mechanism comprises a servomotor fixed to the rotor head and having an output shaft having a male screw thread part, and a plurality of blade links each of which is supported via the supporting shaft fixed to the rotor head for swinging, an end part of each link being connected to a blade link guide engaged with the male screw thread of the output shaft of said servomotor, the other end being connected to each blade, and the tilt angle of the blades can be changed by swinging said blade link around said supporting shaft through the rotation of the output shaft of said servomotor.

Yet further, it is preferable that said blade tilting mechanism comprises a plurality of blade links each of which is supported via the supporting shaft fixed to the rotor head for swinging, and fluid pressure actuators each bridging between the protrusion extending from the center of the end of the rotor head and each blade link for changing the blade tilt angle in the direction of the axis of rotation of the rotor head by the extension and contraction of said actuator.

The tenth means of the present invention is an operating method of the wind turbine with an active annular plane area control mechanism comprising a plurality of blades attached to a rotor head for transmitting the wind force acting on the blades to the output shaft of the wind turbine connected to the rotor head, wherein the speed of the wind acting on the blades is detected, average wind speed during a certain period of time is calculated from the wind speed detected continuously by said wind speed detector, the active annular plane area optimal for the average wind speed is calculated, and the rotation angle of said connecting elbow is adjusted so that active annular plane area becomes equal to said calculated value through composing such that each blade is capable of being tilted in the direction of the axis of rotation of the rotor head.

According to the ninth and tenth means, the speed of the wind acting on the blades is detected by the wind speed detector and inputted to the controller, and the controller calculates the average wind speed during a certain time period from the wind speed detected continuously by said wind speed detector and also calculates the active annular plane area the optimal wind turbine output for the average wind velocity from the predetermined relation between average wind speed and wind turbine output, and determines the active annular plane area based on said output.

The wind turbine is provided with the blade tilting mechanism for changing the active annular plane area by tilting the blades toward the axis of rotation of the rotor head, and said controller calculates the tilt angle of the blades to realize said calculated active annular plane area and output it to the actuator of said blade tilting mechanism.

The blade tilting mechanism tilts the blades so that said calculated active annular plane area is realized by the tilting and keeps the blade at the position.

Thus, said controller allows the blades to be at right angle to the axis of rotation of the rotor head, accordingly active annular plane area is at maximum when average wind speed is lower than the predetermined lower limit value so that a maximum power is taken-in from wind. In this case, as wind speed is low, fatigue failure of the rotating components such as the blades and rotor does not occur by increasing the active annular plane area to the maximum.

When average wind speed is higher than the predetermined higher limit value, the blades are tilted toward the axis of rotation of the rotor to decrease active annular plane area in order to evade the occurrence of fatigue failure of the rotating components.

When average wind speed is between said lower limit and higher limit, the output of the wind turbine is determined according to the average wind speed and the blades are tilted to a position with which said determined power is obtained, and the wind turbine is operated with an optimal output taking into consideration fatigue failure of the rotating components.

By this, the wind turbine can be operated with the tilt angle of the blades adjusted and fixed at the position so that the output is a maximum within the range of evading the occurrence of fatigue failure of the rotating components such as the blades and rotor.

Further, according to the ninth and tenth means, the blades can be adjusted to the same tilt angle in synchronism with each other by a single or pair of fluid pressure actuators or a single or a pair of servomotor, so the blade tilting mechanism is of simple construction, and as the connection between the output shaft of the fluid pressure actuator or servomotor is of link connection, variations in the tilt angles of the blades are small and blade tilt angle control can be possible with high accuracy.

The adjustment of the active annular plane area is possible by changing independently the tilt angle of each blade by means of the fluid pressure actuator, and it is possible to adjust the tilt angle of each blade to an optimal position taking into consideration the output power of the wind turbine and fatigue limit of the rotating components.

As has been described above, according to the ninth and tenth means, the problem that may occur with conventional wind turbines having no adjusting means for adjusting active annular plane area, i.e., the occurrence of fatigue failure of the rotating components such as the blade and rotor due to excessive high speed wind sometimes experienced by a gust of wind is prevented, and the wind turbine can be operated with a maximum output while avoiding the occurrence of fatigue failure of the rotating components such as the blades and rotor by adjusting the active annular plane area by changing the tilt angle of the blades according to the speed of the wind acting on the blades.

Therefore, according to the ninth and tenth means, the wind turbine can be operated while always automatically controlling blade length so that the occurrence of fatigue failure of the rotating components such as the blades and rotor and at the same time with the optimal active annular plane area which insures a maximum of the wind turbine output within the range capable of evading the fatigue failure.

Accordingly, the operation of wind turbine is possible with an optimal maximum output with elongated fatigue life of the rotating elements such as the blades and rotor.

It is suitable to use an oil hydraulic actuator or pneumatic actuator as said fluid pressure actuator.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 6:
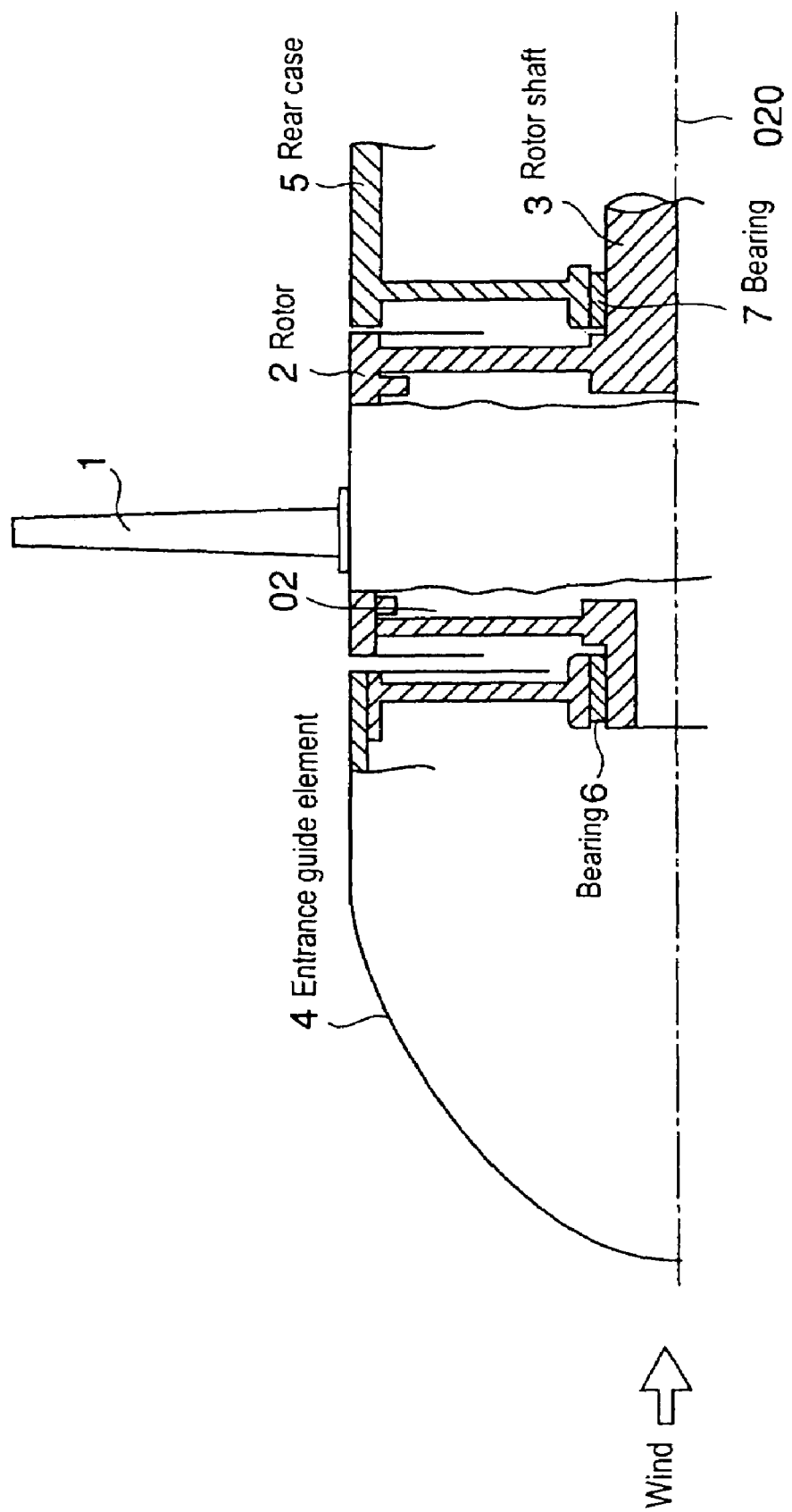
FIG. 6 is a partial vertical longitudinal sectional view of said embodiments of the wind turbine.

Referring to FIG. 6 showing upper half of the wind turbine of the first, second, and third embodiments, reference numeral 2 is a rotor formed into a cylindrical shape and with a plurality of blades 1 (three blades in this example) attached on the periphery at an equal spacing along the circumference by the means described later, the rotor having a rotor shaft 3 in the rear portion, a blade shifting mechanism as described later being provided in the hollow space 02 of the rotor.

Reference numeral 4 is an entrance guide element fixed to a wind turbine support not shown in the drawing, the outer diameter of the rear portion of the entrance guide adjacent the rotor being about the same with that of the rotor. Reference numeral 5 is a rear case also fixed to said wind turbine support, the outer diameter of the front portion of the rear case adjacent the rotor being about the same with that of the rotor.

Said rotor 2 is supported by said entrance guide element 4 via a bearing 6 at the front side thereof and supported by said rear case 5 via a bearing 7 at the rear side thereof for rotation around the center axis 02 of the rotor.

Figure 12:
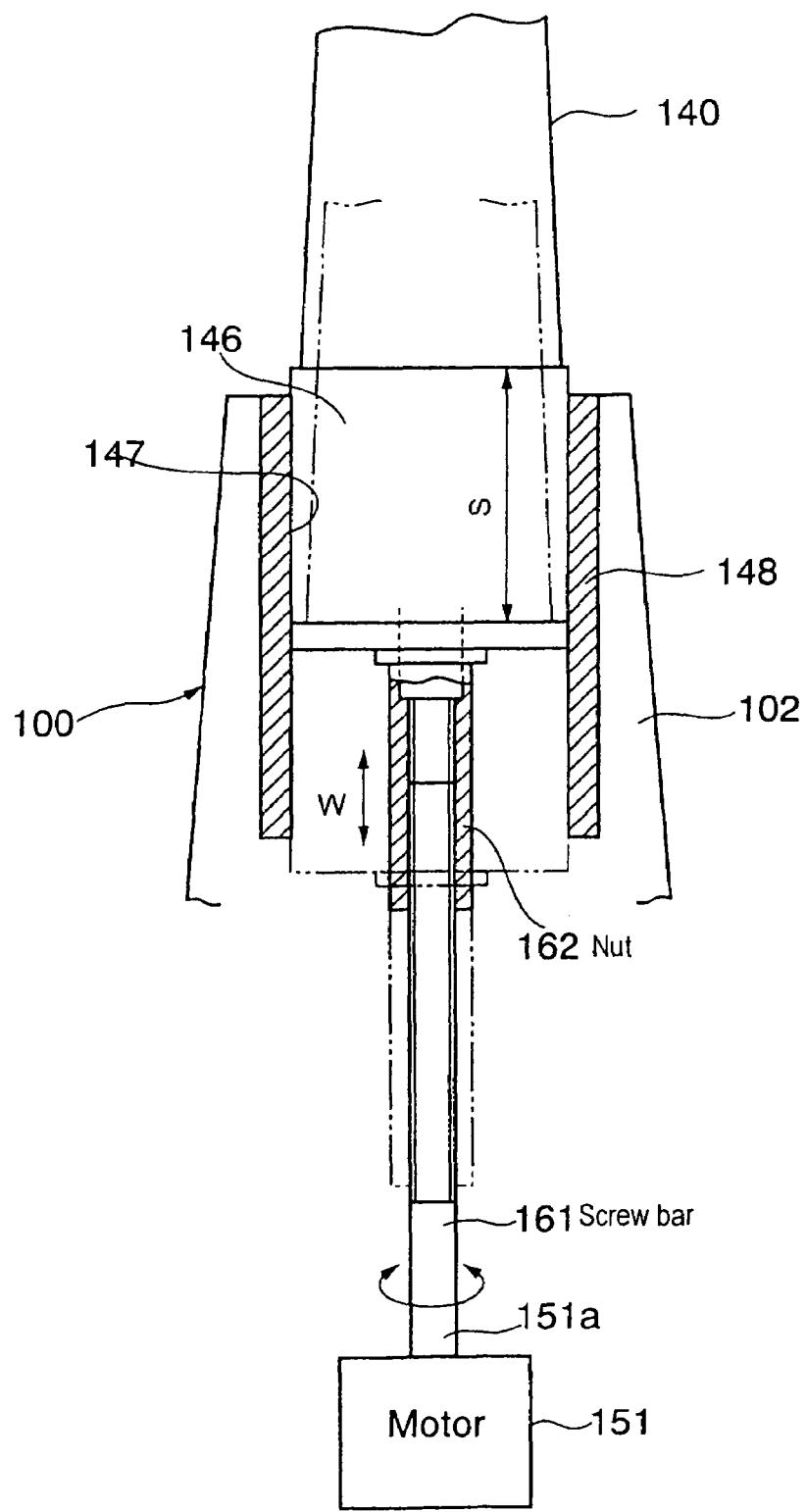
FIG. 12 is a partial transverse sectional view showing the construction of the blade length adjusting mechanism of the $9^{th}$ embodiment corresponding to FIG. 2.

Referring to FIG. 12 showing the first embodiment, the sliding portion 1a formed at the root of each of said blades 1 is inserted for reciprocal movement in each of holes 2a drilled in said cylindrical rotor 2 in radial direction at equal spacing.

At the middle between adjacent blades are drilled three holes 2b (the may be a plurality of holes) on the circumference of the rotor and an end portion of each of screw bars 10, each having a threaded part in the middle thereof, is inserted in each of the holes 2b for rotation and not movable in the direction of its axis. Reference numeral 16 are sleeves (nuts) screwed to said threaded parts of said screw bars 10. Reference numeral 13 are links each of which is fixed to the root of each of the blades 1, both ends of each link 13 being connected to an end of each of links 12 by means of pins 14, the other end of each link 12 being connected to each of links 17 each being fixed to each sleeve 16 via each of pins 15.

Figure 2:
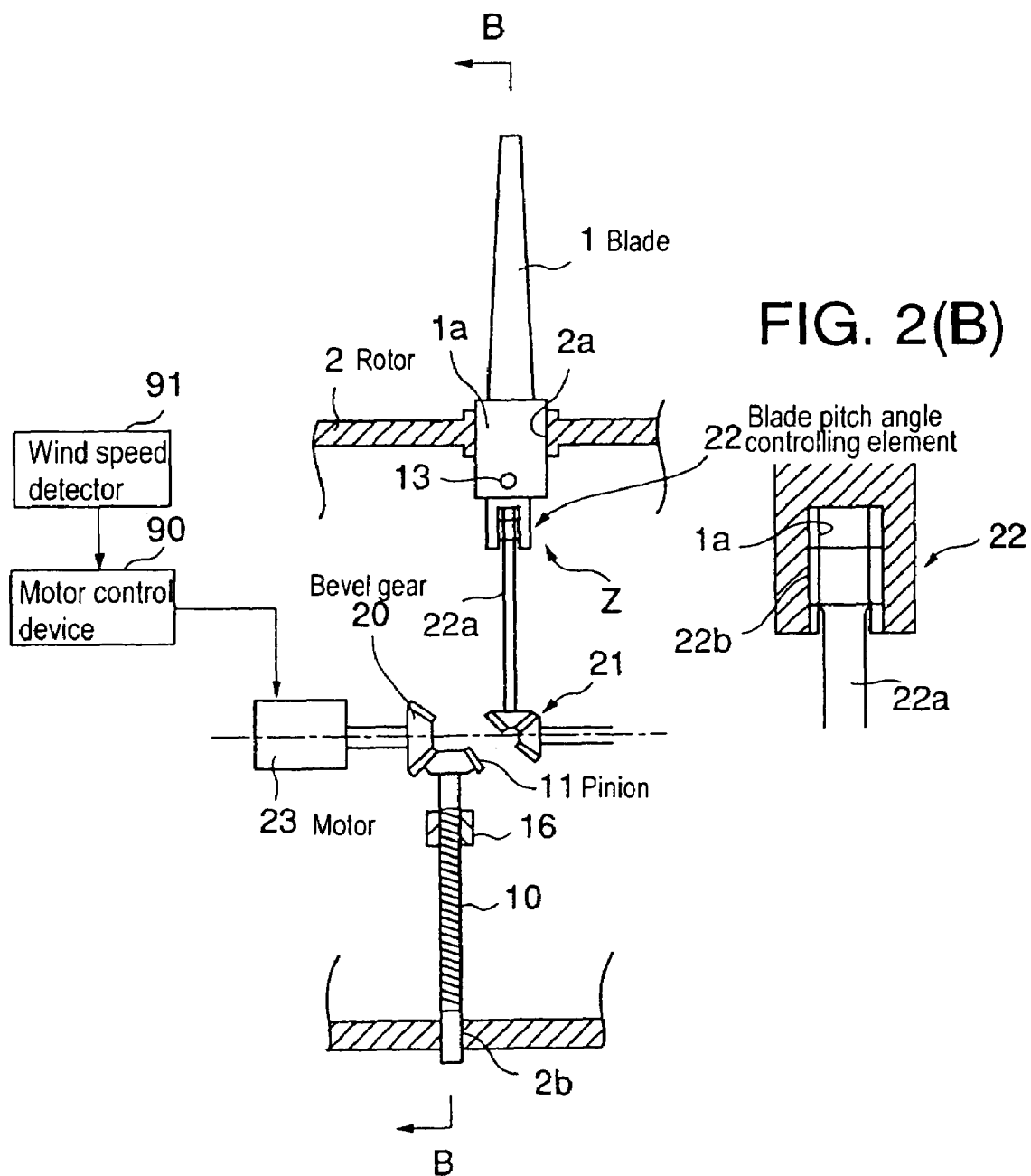
FIG. 2(A) is a partial vertical longitudinal sectional view of the wind turbine of FIG. 1.
FIG. 2(B) is an enlarged detail of portion Z of FIG. 2(A).

In FIG. 2, reference numeral 23 is a motor fixed to said rear case 5 or said entrance guide element 4. Reference numeral 20 is a bevel gear connected to the output shaft of said motor 23. The bevel gear 20 meshes with each of pinions formed at the other end of each of said screw bars 10 and each screw bar 10 is rotated by the rotation of said bevel gear 20.

Figure 1:
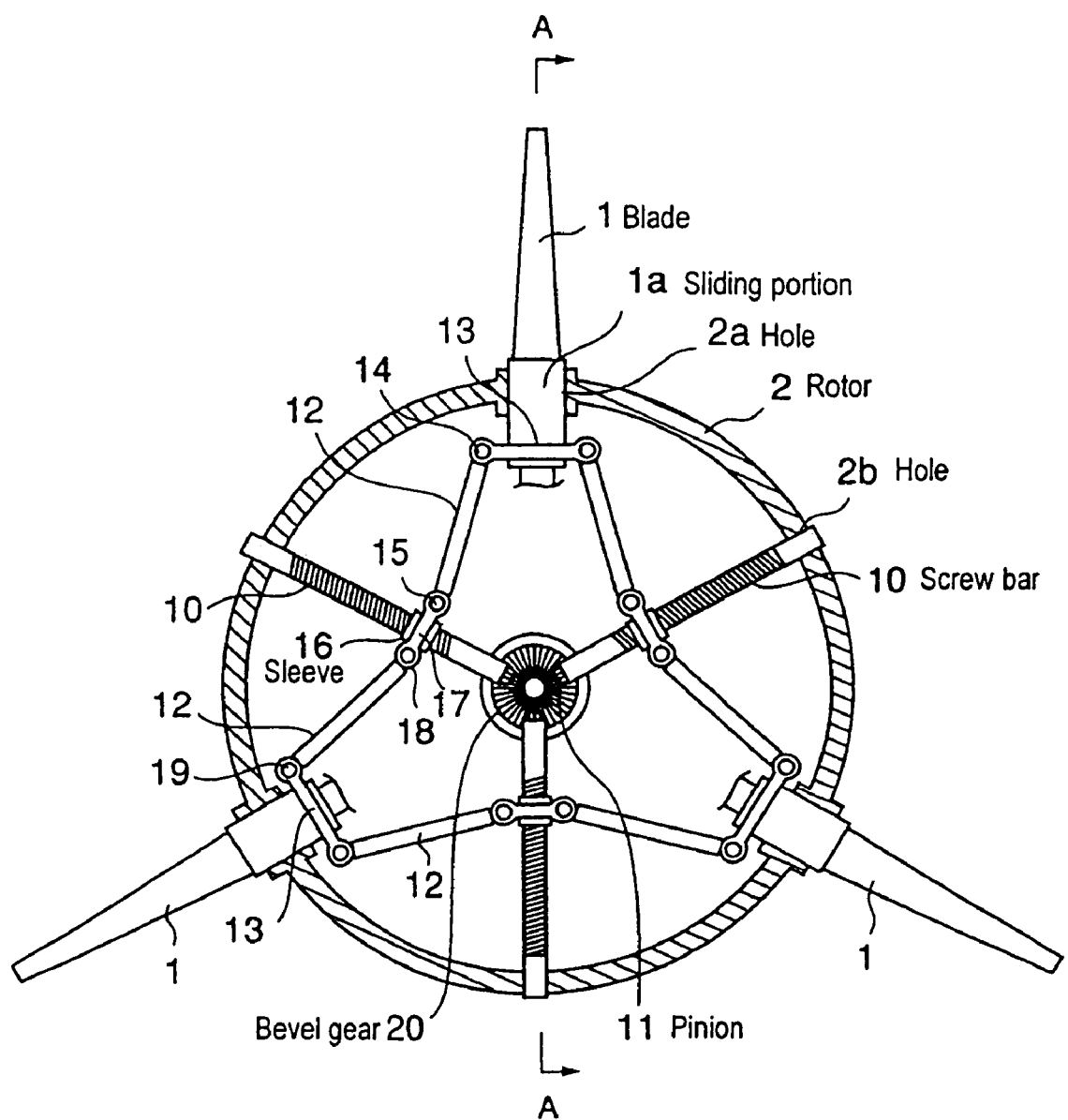
FIG. 1 is a transverse sectional view of the $1^{st}$ embodiment of the wind turbine capable of moving blades in radial direction according to the present invention (sectional view taken in the direction of arrows B-B of FIG. 2)

Reference numeral 22 is a blade pitch angle controlling element for varying the pitch angle, 21 is a bevel gear mechanism for transmitting driving force to change the pitch angle, 22a is a connecting shaft for connecting said bevel gear mechanism with said blade pitch angle controlling element 22. The connecting shaft 22a and blade pitch angle controlling element 22 are connected by spline connection (in FIG. 2(B), 1a is a female spline of the blade pitch angle controlling element 22 and 22b is a male spline of the connecting shaft 22a side), and said blade pitch angle controlling element 22 can be moved in a radial direction relative to the rotor 2 together with the blade 1. The structure of said blade pitch controlling element is known and detailed explanation is omitted.

Reference numeral 91 is a wind speed detector for detecting the speed of wind acting onto the blade 1, 90 is a motor control device. The motor control device 90 calculates the required active annular plane area and the radial blade position corresponding with the required active annular plane area based on the detected signal of wind speed inputted from said wind speed detector 91 as mentioned later, and outputs the result to said motor 23.

Wind flows from the annular plane of area S to act on the blades 1 and rotate the rotor 2, then flows out guided by the periphery of the rear case 5. The rotating force of the rotor 2 is transmitted via the rotor shaft to drive the driven machinery such as a generator.

Next, the controlling of radial movement of said blade 1 will be explained.

The wind speed detected by said wind speed detector 91 is inputted to said motor control device 90. In the motor control device 90 are set beforehand a relation 1 which is the relation between the output P of the wind turbine, wind speed V, and active annular plane area S, as shown previously by equation (2) and a relation 2 which is the relation between the limit wind speed which induces fatigue failure of the rotating elements such as the blades and rotor and an active annular plane area S.

When it is judged by the motor control device 90 that with present radial position of blades the detected wind speed is smaller than the wind speed for outputting required power of the wind turbine, the active annular plane area and radial blade position required to output the required power under the detected wind speed are calculated, and the motor control device 90 outputs a signal to said motor 23 to move the blades to the calculated radial position.

The motor 23 rotates the pinion 11 via the bevel gear 20 by the amount corresponding to the signal from the motor control device 90. The screw bar 10 is rotated by the rotation of the pinion, and the sleeve 16 moves along the screw bar 10 to move the blade 1 in a radial outward direction via the links 12 and 13, resulting in increased active annular plane area.

By this operation, the active annular plane area is adjusted for the wind turbine to output the required output.

Further, when the detected wind speed exceeds said limit speed, the motor control device 90 calculates the active annular plane area and radial blade position corresponding thereto for the limit wind speed and output a signal to the motor 23 to move the blades to the calculated radial position.

The motor 23 moves the blade 1 in a radially inward direction via the bevel gear 20 pinion 11, screw bar 10, sleeve 16, and links 12 and 13 to reduce the active annular plane area. By this operation, the active annular plane area is adjusted for the wind turbine to be operated within the range of wind active annular plane area with which the occurrence of fatigue failure can be avoided.

As mentioned above, according to the first embodiment, the blades are moved in a radially outward directions to increase the active annular plane area as detected wind speed decreases, and the blades are moved in a radially inward directions to decrease the active annular plane area as detected wind speed increases. By controlling the radial position of the blades like this, the wind turbine can be operated so that the output as high as possible is obtained while avoiding the occurrence of fatigue failure of the rotating components such as the blades and rotor under the present wind speed.

Figure 3:
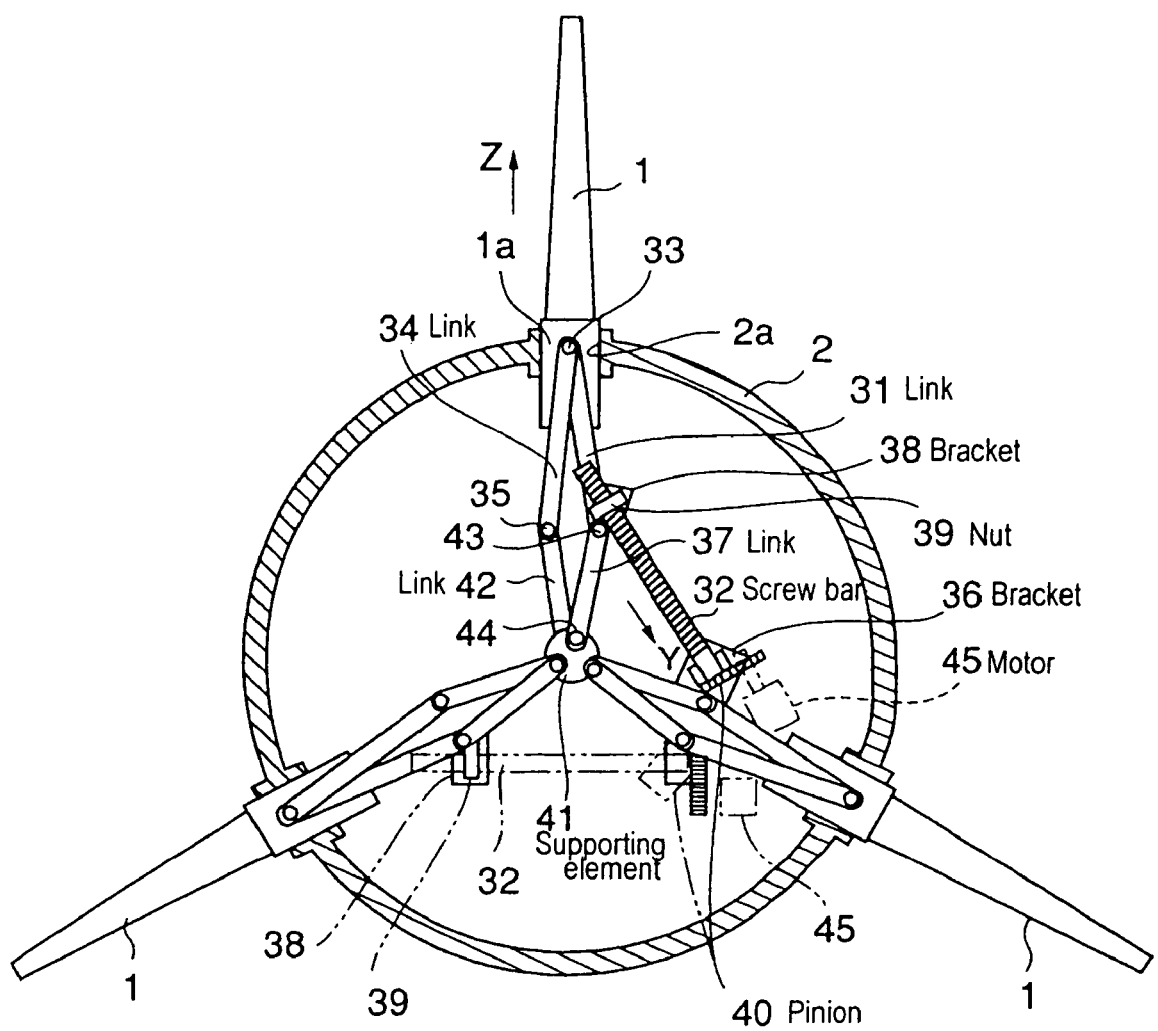
FIG. 3 is a transverse sectional view of the $2^{nd}$ embodiment of the wind turbine corresponding to FIG. 1.

Referring to FIG. 3 showing the second embodiment, a supporting element 41 is provided in the center of a rotor 2, and the supporting element 41 and the sliding portion 1a of each blade 1 are connected by an extendible and contractible link mechanism composed of a pair of link set 31, 37 and 34, 42 connected by means of pins 33, 35, 44, and 33, 43, 44.

A screw bar 32 is provided between a bracket 38 and 36, which are fixed to each of the links 31 for adjacent two blades, an end side of the screw bar 32 being screwed into a nut 39 fixed on said bracket 38, the other end side being supported for rotation by said bracket 36. At the end of this other end side is fixed a pinion 40 which is rotated by a motor 45 via a pinion fixed to the shaft of the motor 45.

With the second embodiment, when said screw bar 32 is shifted, for example, in the direction of arrow Y by rotating the pinion 40 the rotation of the motor 45, said pair of link set 34, 42 and 31, 37 are made narrower and the blade 1 is moved in the radial direction of arrow Z.

By this operation, the protrusion of the blade 1 from the outer circumference of the rotor 2 is increased and the active annular plane area increases. To decrease the active annular plane area, said pinion 40 is rotated in the reverse direction to make the pair of link set 34, 42 and 31, 37 opened wider by means of the screw bar 32 and the blade 1 is moved radially inward.

Figure 4:
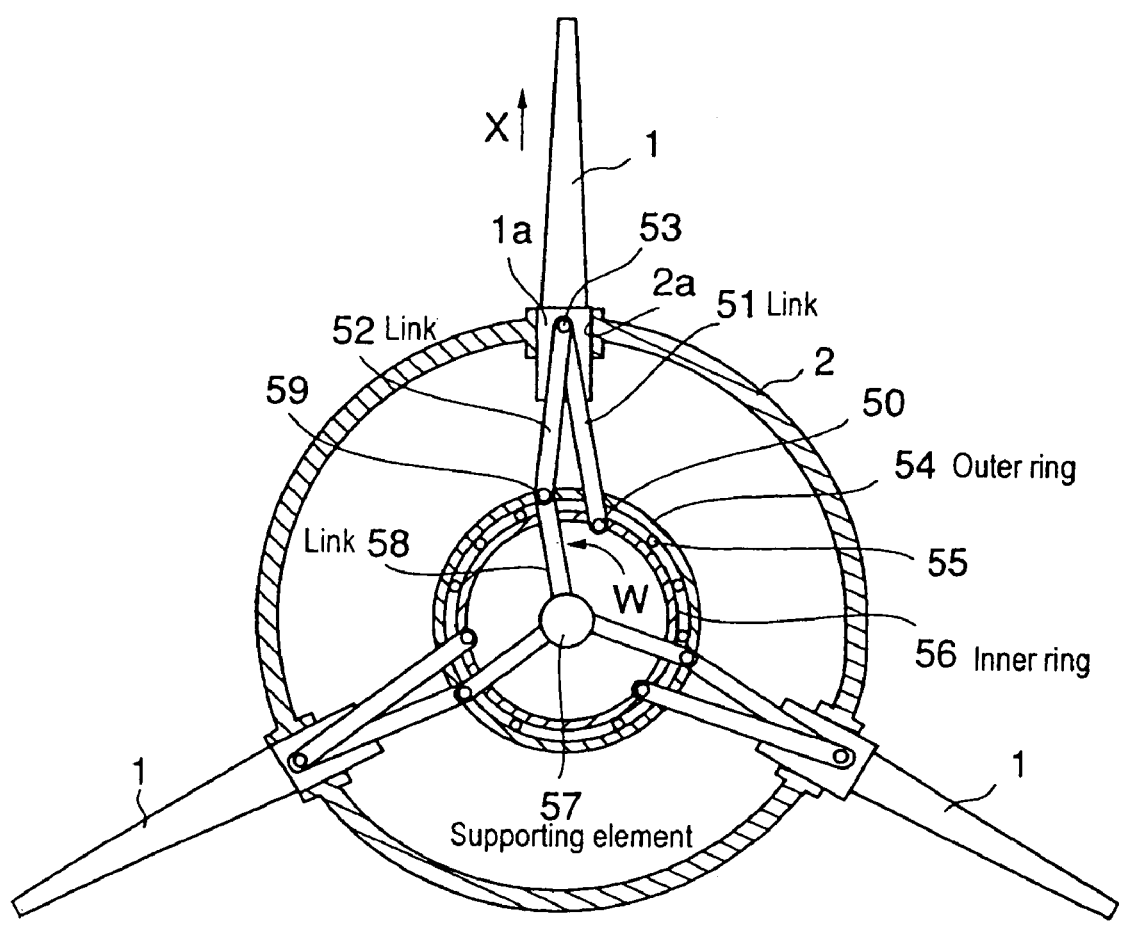
FIG. 4 is a transverse sectional view of the $3^{rd}$ embodiment of the wind turbine corresponding to FIG. 1.

In the case of the third embodiment shown in FIG. 4, a supporting element 57 is provided in the center of the rotor 2, and two rings, an inner ring 56 and an outer ring 54 capable of reverse rotation relative to each other are provided. Said supporting element 57, said outer ring 54, and the sliding portion 1a of the blade 1 are connected by two links 52 and 58 via pins 53 and 59, and said inner ring 56 and said sliding portion 1a of the blade 1 are connected by a link 51 via pins 50 and 53.

According to the third embodiment, when said inner ring 56 is rotated for example in the direction of arrow W, the left-side link 52, 58 and the right-side link 51 are made narrower and the blade 1 is moved in the radial direction of arrow X.

By this operation, the protrusion of the blade 1 from the outer circumference of the rotor 2 is increased and the active annular plane area increases. To decrease the active annular plane area, said inner ring 56 is rotated in the reverse direction to made the left-side link 52, 58 and the right-side link 51 opened wider to move the blade 1 radially inward.

Figure 5:
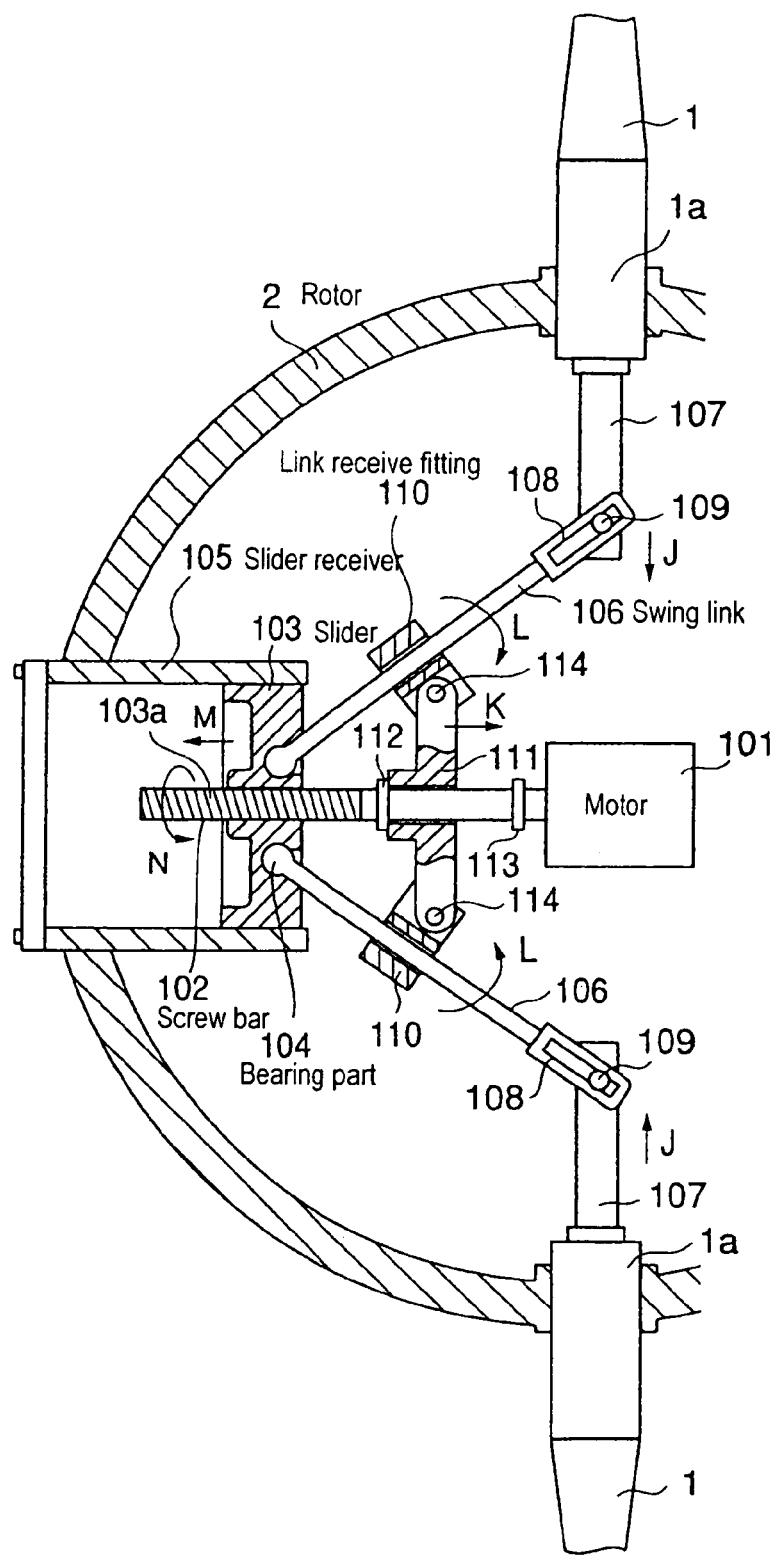
FIG. 5 is a transverse sectional view of the $4^{th}$ embodiment of the wind turbine corresponding to FIG. 1.

In the $4^{th}$ embodiment shown in FIG. 5, reference numeral 105 is a slider receiver fixed to the rotor 2 with its center axis passing through the center of the rotor 2, and 103 is a slider inserted in said slider receiver 105 reciprocation, a screw hole 103a being provided at the center of the slider 103.

Reference numeral 101 is a motor, 102 is a screw bar fixed to the output shaft of the motor 101, the screw bar 102 being screwed into the screw hole 103*a* of said slider 103.

A link 107 is fixed to the inside end of the sliding portion 1*a* of the blade 1.

Reference numeral 106 is a swing link, an end thereof being formed into a spherical or cylindrical shape and received in a spherical or cylindrical bearing part 104 provided in said slider 103 so that the swing link 106 can swing around the bearing part 104. The other end part of the swing link 106 has an elongated hole 108 through which the swing link is connected to the link 107 fixed to the blade 1 via a pin 109.

Reference numeral 111 is a supporting link fitted for reciprocation to said screw bar 102. Reference numeral 110 is a link receiver fitting to said swing link 106 to guide the swing link 106. The lower end part of the link receiver 110 is connected to the outer end part of said supporting link 111 via a pin 114. Reference numeral 112, 113 are stoppers provided on said screw bar 102 at a spacing, said supporting link being capable to reciprocate between the stoppers 112, 113. Two set of link mechanisms are configured to adjust the radial blade position of two blade as shown in FIG. 5.

With this construction of the $4^{th}$ embodiment, when the screw bar 102 is rotated, for example, in the direction of arrow N by the motor 101, the slider 103 moves along the slider receiver 105 to the direction of arrow M, the swing links 106 swing around the bearing parts 104 in the direction of arrows L guided by the link receiver 110, and the links 107 move to the direction of arrows J guided by the elongated holes 108 to move the blades 1 radially inward respectively.

By this operation, the protrusion of the blade 1 from the outer circumference of the rotor 2 is decreased and the active annular plane area decreases. When the screw bar 102 is rotated in the reverse direction, the protrusion of the blade 1 from the outer circumference of the rotor 2 is increased and the active annular plane area increases.

Figure 7:
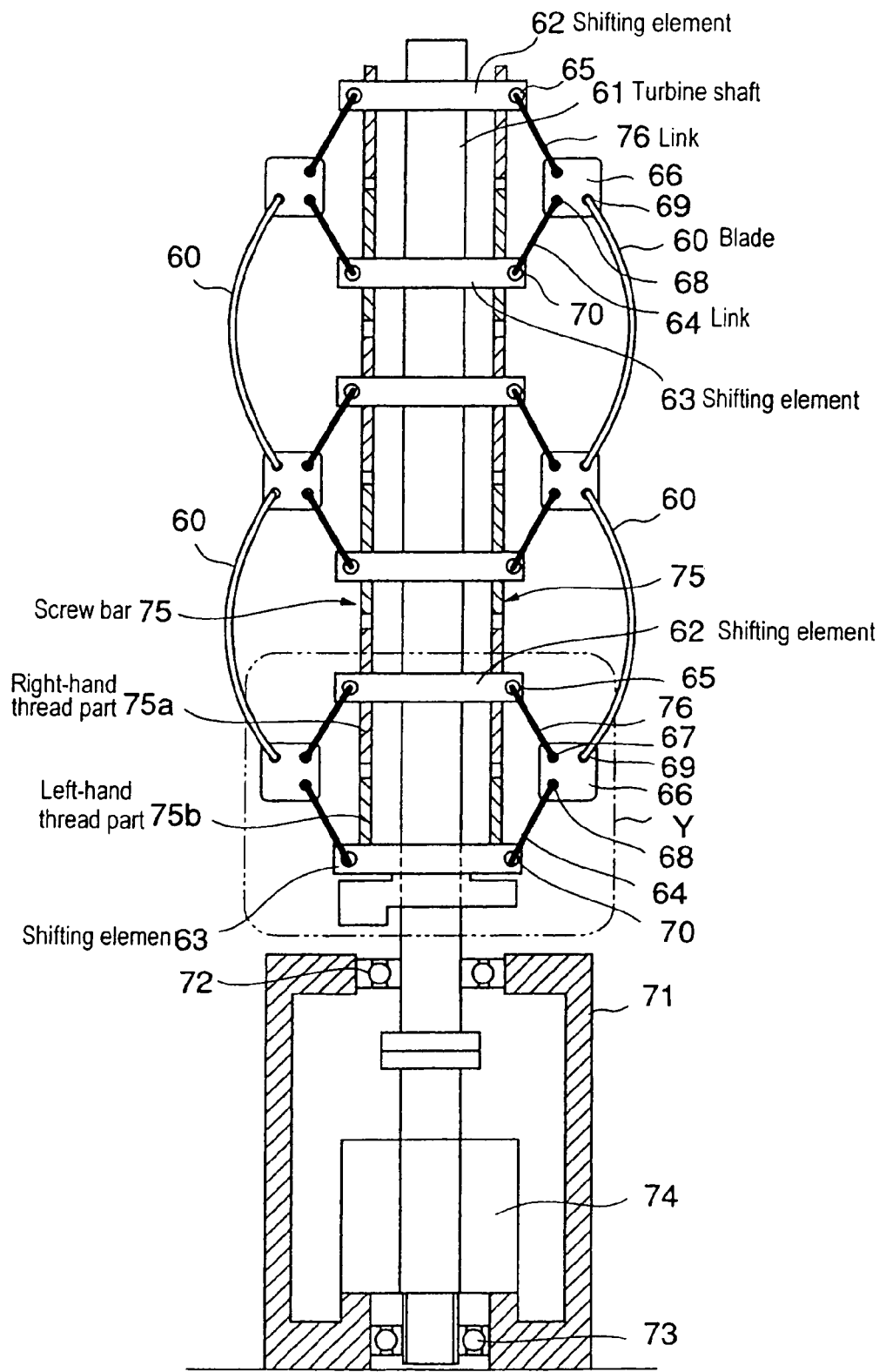
FIG. 7 is a transverse sectional view of the $5^{th}$ embodiment which is a darrieus type, showing the mechanism of spreading blades in radial direction.

The $5^{th}$ embodiment shown in FIG. 7, 8 is a case where the present invention is applied to a darrieus type wind turbine. In the drawing, reference numeral 61 is a turbine shaft erected upright. Reference numeral 75 refers to screw bars erected upright parallel to the vertical turbine shaft 61 in neighboring position of both sides of the shaft 61. Each of the screw bars 75 has right-hand thread parts 75*a* and left-hand thread parts 75*b* cut by turns along the bar.

Reference numeral 66 refers to a plurality of supporting elements provided along the direction of axis of the turbine shaft 61 (three supporting elements in this example), and a plurality of sets of blades 60 are provided between the adjacent supporting elements 66 and they are attached to the elements 66 by means of pins 69. The blades 60 are provided along the turbine shaft 61 in one stage or in a plurality of stages (in two stages in the example).

Three pairs (one pair or a plurality of pairs are acceptable) of shifting elements 62, 63 are provided. One of each pair has a right-hand female screw thread on both end sides, each of the female screw thread being engaged with the right-hand thread part 75*a* of each of said screw bars 75. The other of each pair has a left-hand female screw thread on both end sides, each of the female screw thread being engaged with the left-hand thread part 75*b* of each of said screw bars 75. Each one of the pair moves in the direction contrary to each other by the rotation of the screw bars. Each of the shifting elements 62, 63 is attached to the turbine shaft 61 by means of a key 77 so that the elements can be moved in the direction of the axis of the screw bar 75 but is not rotatable. Links 76, 64 compose a pair of links connecting said supporting element 66 to said pair of shifting elements 62, 63 via pins 67, 68 and 65, 70.

Said turbine shaft 61 is supported for rotation by a case 71 fixed on the ground via bearings 72 and 73. Reference numeral 74 is a electric generator driven by the wind turbine.

Figure 8:
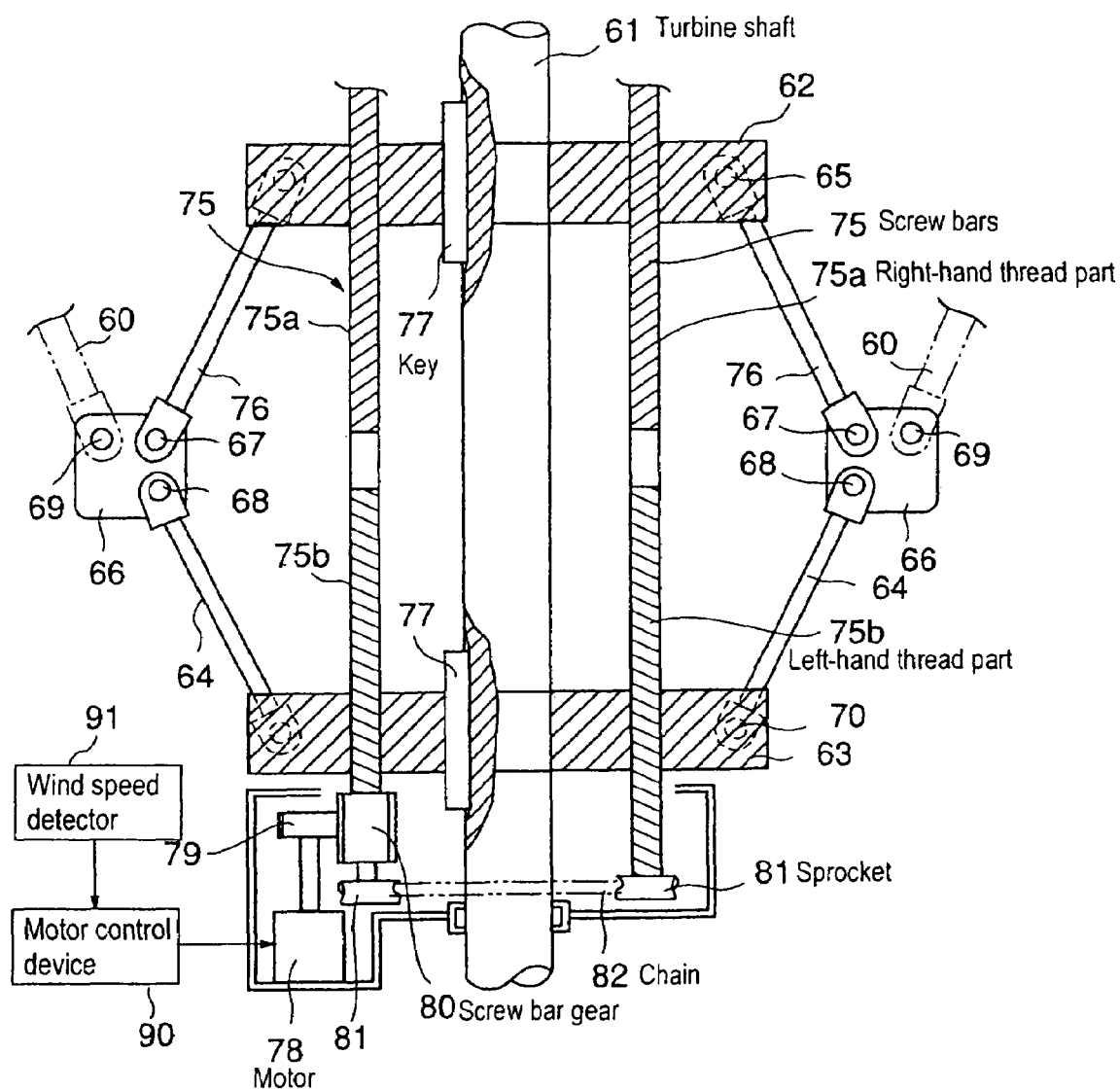
FIG. 8 is an enlarged detail of portion Y in FIG. 7.

Referring to FIG. 8, reference numeral 78 is a motor, 79 is a output shaft gear of the motor 78, the output shaft gear 79 meshing with the screw bar gear 80 fixed to the lower end part of one of said screw bars 75. Sprocket 81 is fixed to the lower end part of each of the screw bars 75, and a chain 82 runs between the sprockets. The rotating force of said motor 78 is transmitted by the chain 82 so that the rotation speed of both screw bars is the same.

Reference numeral 91 is a wind speed detector for detecting the speed of wind acting on the wind turbine. Reference numeral 90 is a motor control device, which calculates the required active annular plane area of the blades 60 and the blade radial position corresponding to the required annular plane area based on the detected wind speed inputted from the wind speed detector 91 and controls the motor driving according to the method described later.

With the $5^{th}$ embodiment, when the detected wind speed is inputted from said wind speed detector to the motor control device 90, the motor control device 90 calculate the required active annular plane area of the blades 60 and the blade radial position corresponding to the required annular plane area based on the detected wind speed for the detected wind speed.

The control of the active annular plane area of the blades 60 and the blade radial position is performed, similarly in the case of the first to third embodiment, so that the blades 60 are moved in a radially outward direction to increase the active annular plane area of the blades 60 as the detected wind speed decreases, and the blades 60 are moved in a radially inward direction to decrease the active annular plane area of the blades 60 as the detected wind speed increases.

To move the radial position of blades 60 outward when detected wind speed decreases, the motor 78 is driven by the control signal from said motor control device 90 to rotate the left and right bar 75, 75 in synchronism with each other via the output shaft gear 79, screw bar gear 80, chain 82, and sprocket 81, and the elements 62 and 63 of the shifting element pair, each of which is engaged with the right-hand thread part 75*a* and the left-hand thread part 75*b* of the screw bars 75 respectively, are caused to be drawn nearer. By this action, the supporting elements 66 supporting the blades 60 are moved radially outward via the pairs of links 64 and the radius of rotation of the blades 60 is increased.

To move the radial position of blades 60 inward when detected wind speed increases, the motor 78 is driven to rotate in the reverse direction, the elements 62 and 63 of the shifting element pair, each of which is engaged with the right-hand thread part 75*a* and the left-hand thread part 75*b* of the screw bars 75 respectively, are caused to be drawn remoter. By this action, the supporting elements 66 supporting the blades 60 are moved radially inward via the pairs of links 64 and the radius of rotation of the blades 60 is decreased.

According to the $1^{st} \sim 5^{th}$ embodiments, it is possible to control the radial position of blades 1 so that the radius of the radial blade position is increased by moving the blades radially outward as wind speed decreases and it is decreased by moving the blades radially inward as wind speed increases. By controlling the radial position of the blades thusly, the wind turbine can be operated so that the output as high as possible is obtained while evading the occurrence of fatigue failure of the rotating components such as the blades and rotor under the present wind speed.

Figure 14:
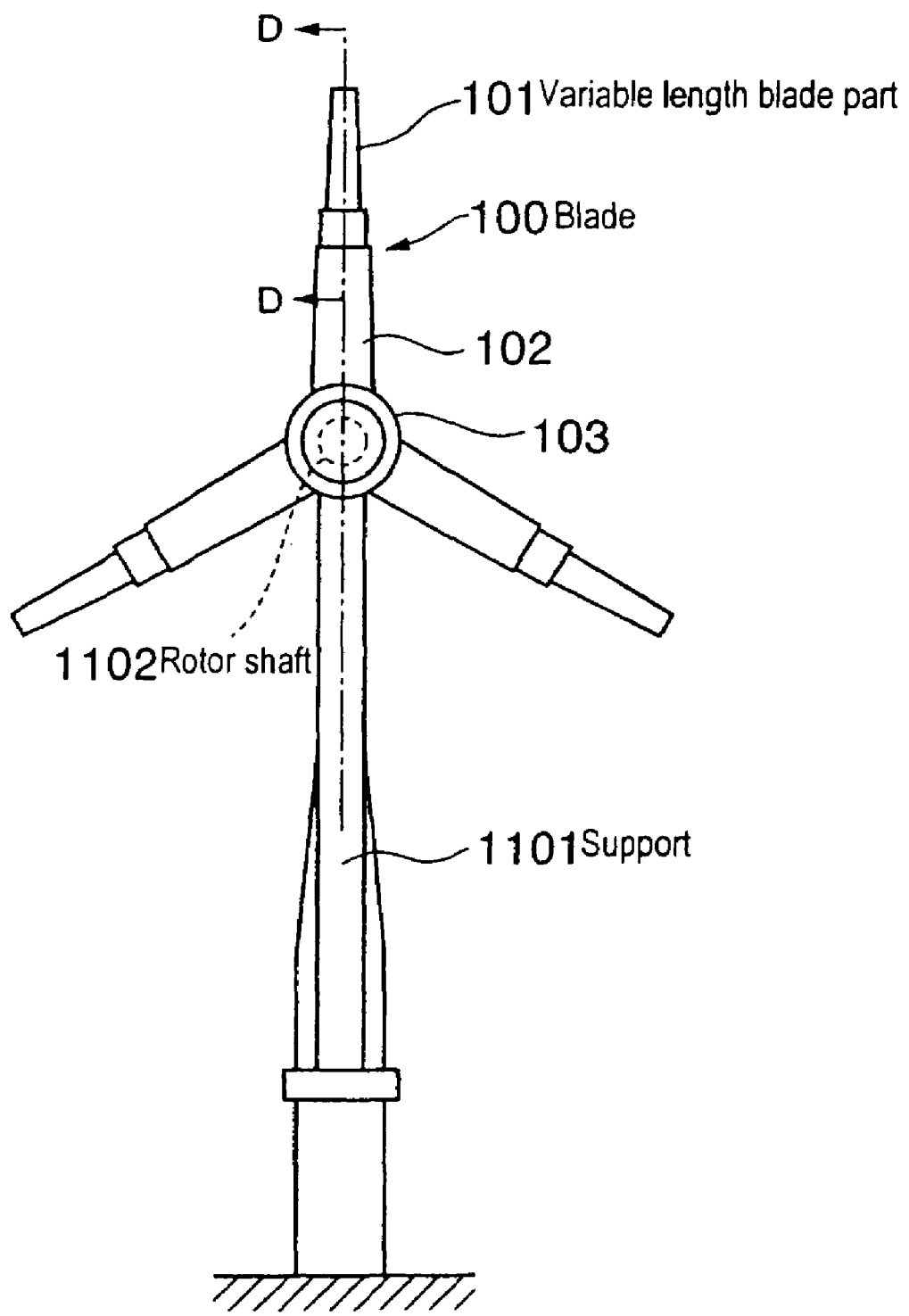
FIG. 14 is a front view of a wind turbine to which the present invention is applied.

Here, referring to FIG. 14 showing a wind turbine to which the present invention is applied, reference numeral 1103 is a rotor having a plurality of blades 100 (three blades in this example) attached on the periphery thereof at an equal spacing in the circumferential direction and having a rotor shaft 1102 fixed to the rear end thereof. Said blades 100 are each composed of a blade body part 102 fixed to said rotor 1103 and a variable length blade part 101 which is attached to said blade body part 102 capable of being moved radially in the direction of blade length. Reference numeral 1101 is a support for supporting the wind turbine.

Figure 9:
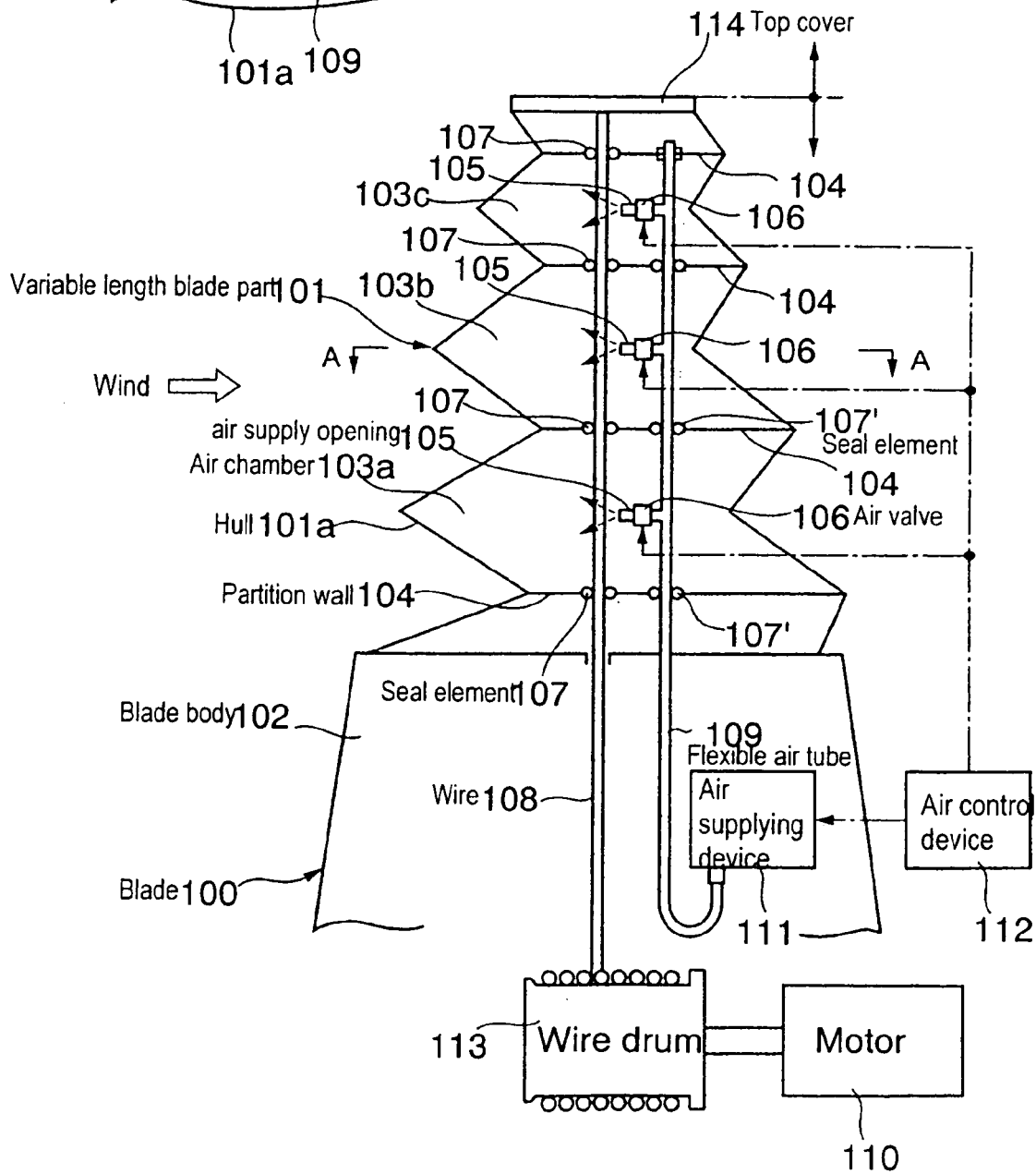
FIG. 9 is a diagrammatic illustration of the blade length adjusting mechanism of the $6^{th}$ embodiment of the wind turbine with variable length blades according to the present invention, (A) is a sectional view taken in the direction of arrows D-D of FIG. 14, and (B) is a sectional view taken in the direction of arrows A-A of FIG. 9(A).

Referring to FIG. 9 showing the 6th embodiment, reference numeral 101 is a variable blade length part formed in an extendible and contractible bellows shape, which configured as follows.

Reference numeral 101a is a hull formed in a bellows shape in the direction of blade length, 103a, 103b, 103c are air chambers in said hull 101a, each of the air chambers being an independent chamber separated by partition walls 104. As shown in FIG. 9(B), hull 101a is formed in a profile such that the shape of cross section perpendicular to the blade length direction is a form capable of effecting aerodynamic lift. A top cover 114 covers the top of the hull 101a.

Reference numeral 108 is a wire passing through the air chambers 103a, 103b, and 103c, 113 is a wire drum winding said wire 108, 10 is a motor for rotating the wire drum 113 to push or draw the wire 108 in the blade length direction. Reference numeral 107 are seal elements provided between the outer surface of the wire 108 and partition walls 104 for sealing each of the air chambers 103a, 103b, and 103c.

Reference numeral 111 is an air supplying device for producing pressurized air, 109 is a flexible air tube connected to the air outlet of the air supplying device, the tube 109 being made of rubber or soft synthetic resin, etc. The flexible air tube 109 is configured so that it can be moved or deformed as the variable length blade part 101 expands or contracts. Reference numeral 105 represents air supply openings of the parts branched off from flexible air pipe 109, each of the openings communicating to the air chamber 103a, 103b, and 103c respectively. Reference numeral 106 represents air valves for opening/closing said air supply openings 105. Reference numeral 107' represents seal elements for sealing the air chambers 103a, 103b, 103c.

Reference numeral 112 is an air control device which controls the opening/closing of said air valves 106 and also controls the operation of said air supplying device 111.

With the 6th embodiment, when wind speed decreases, the air supplying device 111 is operated to produce required air pressure according to the signal from the air control device 112 and the air valves 106 are opened to supply pressurized air from the air supplying device 111 to the air chambers 103a, 103b, 103c. On the other hand, the wire drum 113 is rotated by the motor 111 to draw out the wire 108.

By this operation, the volume of each air chamber 103a, 103b, and 103c is increased, and the variable blade length part 101 formed in a bellows shape is extended radially outward resulting in increased diameter of the blade tip, and therefore the active annular plane area is increased.

When wind speed increases, air pressure of the air supplying device 111 is reduced or the air pressure is released and some or all of the air valves 106 are closed to reduce the pressure of some or all of the air chambers 103a, 103b, and 103c.

On the other hand, the wire drum 113 is rotated in the reverse direction to rereel the wire 108 to draw the top cover 114 fixed to the extremity of the wire 108.

By the operation, the volume of each air chamber 103a, 103b, and 103c decreases, and the variable blade length part formed in a bellows shape is contracted in inward resulting in decreased diameter of the blade tip, and therefore the active annular plane area is decreased.

According to the 6th embodiment, the effective length of the variable length part 101, accordingly the effective length of the blades can be varied to vary the active annular plane area, by supplying pressurized air from the air supplying device 111 by way of a flexible air tube 109 or exhausting the air to or from the air chambers 103a, 103b, and 103c, which are formed in the variable blade length part 1 formed in a bellows shape extendible and contractible in the radial direction of the rotor 1103, through opening/closing the air valves 106 by the command from the air control device 112 and at the same time by varying the diameter of the blade tip through extending or contracting the variable blade length part 101 by drawing out or in by means of a motor 110 the wire 108 connected to the top cover 114 fixed to the top end of the variable blade length part 101.

By this, an active annular plane area can be adjusted to an optimal area in correspondence with wind conditions even in the operation of the wind turbine, and the operation of the wind turbine can be performed so that the output is a maximum while avoiding the occurrence of fatigue failure of the rotating components such as the blades and rotor.

Figure 10:
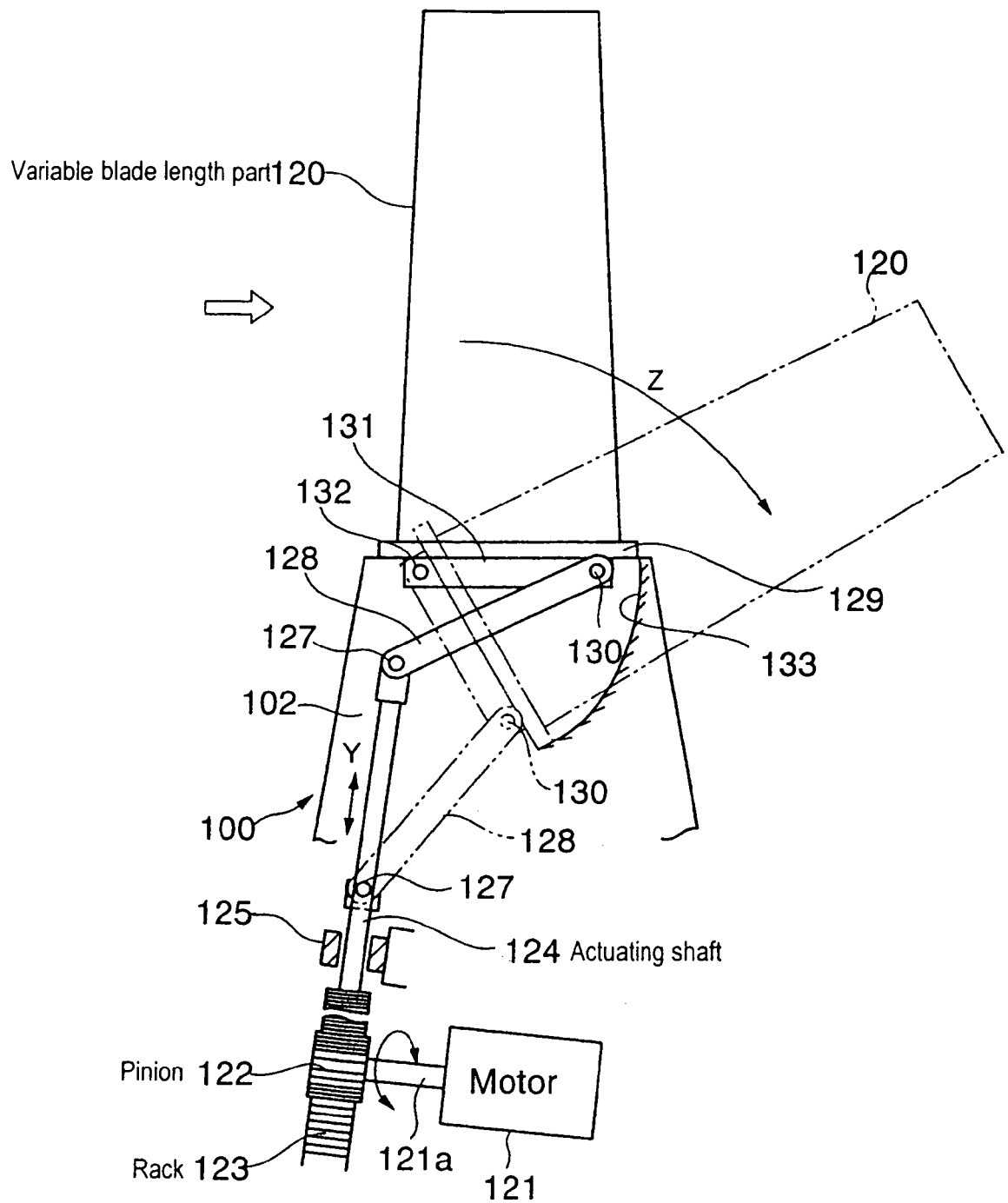
FIG. 10 is a partial transverse sectional view showing the construction of the blade length adjusting mechanism of the $7^{th}$ embodiment.

In FIG. 10 showing the 7th embodiment, a blade 100 is divided into two to a blade body 102 fixed to said rotor 1103 and a variable length blade part 120 which define a part of blade from the middle to the tip of the blade 100.

Reference numeral 131 is a link fixed to the bottom part 129 of the variable blade length part 120. The link 131 and variable blade length part 120 can swing around a supporting shaft 132 guided by a guide face 133 formed in the blade body 102, the supporting shaft 132 being fixed to said blade body 102 and supporting an end side of said link 131 for rotation.

Reference numeral 121 is a reversible motor, 122 is a pinion fixed to the end part of the output shaft 121a of the motor 121. Reference numeral 123 is a rack meshing with said pinion 122, 124 is an actuating shaft connected to the rack 123, 125 is a bearing for supporting the actuating shaft by the blade body 102.

Reference numeral 128 is a link for connecting the end part of the actuating shaft 124 to the other end part of the link 131 via pins 127 and 30.

With the 7th embodiment, when the pinion 122 is rotated in the normal or reverse direction of rotation by the motor 121, the rack 123 meshing with the pinion 122 and the actuating shaft 124 fixed to the rack 123 are reciprocated in the directions shown by double arrow Y. By the reciprocating motion of the actuating shaft, the link 131 is allowed to swing around the supporting shaft 132 via the link 128. By this, the variable blade length part 120 of which the bottom part 129 is fixed to the link 131 swing together with the link 131 around the supporting shaft 132 along the guide face 133.

That is, when the actuating shaft 124 is moved upward by the rotation of the motor 121, the link 131 and variable blade length part 120 are erected as shown with solid line in the drawing resulting in increased tip diameter of the variable blade length part 120. When the motor 121 is rotated in the reverse direction to move down the actuating shaft 124, the link 131 and variable blade length part 120 are swung in the direction of arrow Z of the drawing to be tilted as shown with chain line in the drawing resulting in decreased tip diameter of the variable blade length part 120.

As described above, according to the 7th embodiment, the projected area of the surface of revolution of the blade in the direction of the axis of rotation of the rotor, i.e., the active annular plane area, is changeable by changing the tilt angle of the variable blade length part 120 through swinging the variable blade length part 120 which is supported via the link 131 for rotation by the supporting shaft 132, around the supporting shaft 132 by means of the link 131.

Figure 11:
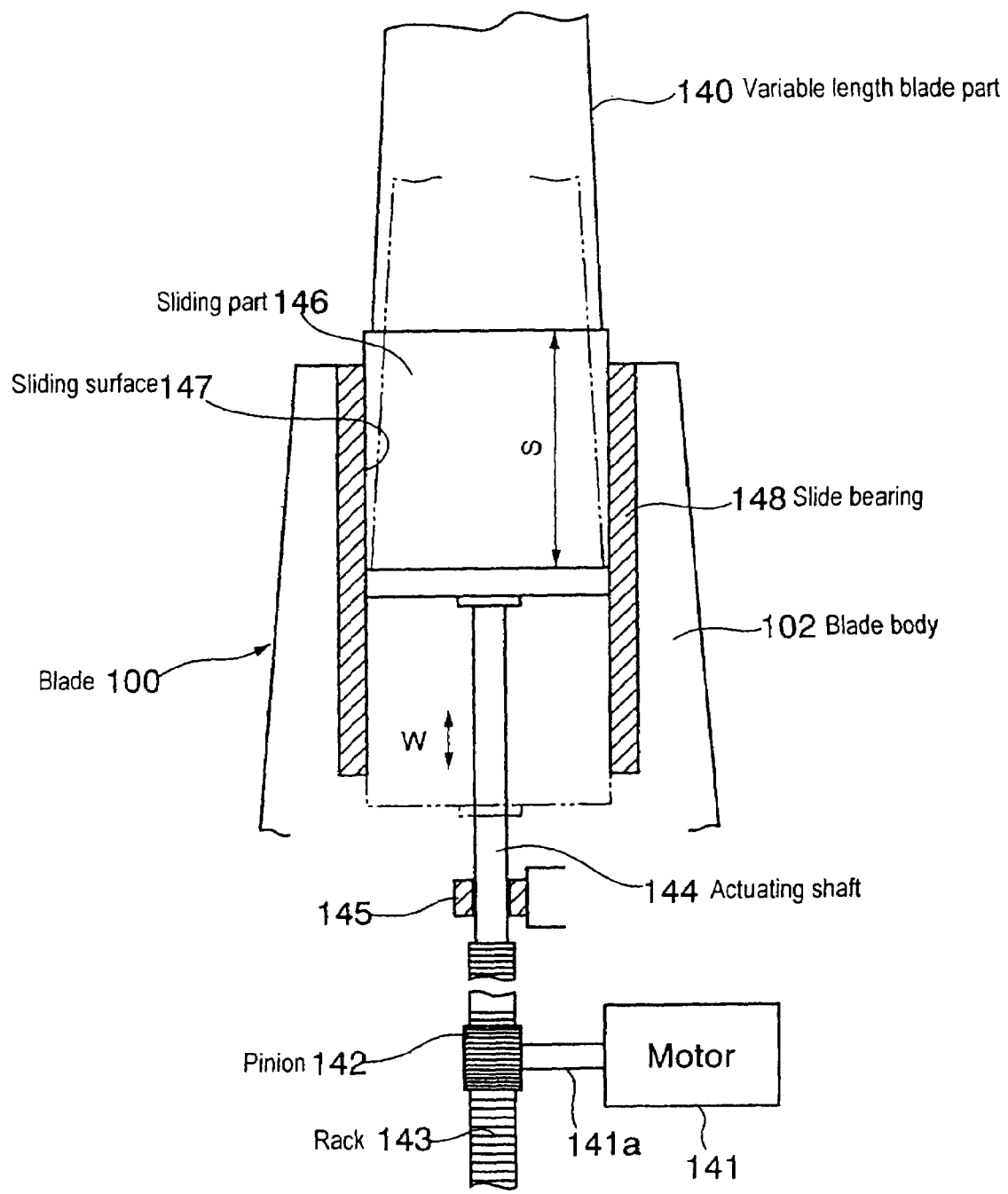
FIG. 11 is a partial transverse sectional view showing the construction of the blade length adjusting mechanism of the $8^{th}$ embodiment corresponding to FIG. 2.

Referring to FIG. 11 showing the 8$^{th}$ embodiment, a blade 100 is divided in two to a blade body 102 fixed to said rotor 1103 and a variable length blade part 140 which define a part of blade from the middle to the tip of the blade 100.

Reference numeral 148 is a pair of slide bearing fixed to the blade body 102. The sliding part 146 formed at the lower portion of the variable length blade part 140 is fit to sliding surfaces of the pair of slide bearings 148 for sliding in the longitudinal direction of blade.

Reference numeral 141 is a reversible motor, 142 is a pinion fixed to the end part of the output shaft 141a of the motor 141. Reference numeral 143 is rack meshing with said pinion 142. Reference numeral 144 is an actuating shaft connected to the rack 143, the other end side of which being fixed to the bottom part of the variable length blade part 140. Reference numeral 145 is a bearing for supporting the actuating shaft 144 by the blade body 102 for rotation.

With the 8$^{th}$ embodiment, when the pinion 142 is rotated by the reversible motor 141 in the normal or reverse direction, the actuating shaft 143 fixed to the rack 143 meshing with the pinion 142 is allowed to reciprocate in the direction of double arrows W. By the reciprocation of the actuating shaft 144, the variable length blade part 140 slides in the longitudinal direction of the blade guided by the pair of slide bearings 148.

That is, when the actuating shaft 144 is moved upward by the rotation of the motor 141, the variable length blade part 140 moves radially outward to be increased in tip diameter thereof.

When the actuating shaft 144 is pulled down by the rotation of the motor 141 in the reverse direction, the variable length blade part 140 moves radially inward by stroke S to the position shown with chain line in the drawing, resulting in a decreased tip diameter of the variable length blade part 140.

As described above, according to the 8$^{th}$ embodiment, the active annular plane area of the blade 100 is changeable by sliding the variable length blade part 140 fit for sliding in the blade body 102.

Referring to FIG. 12 showing 9$^{th}$ embodiment, a screw bar 161 having a male screw thread cut in the end portion is connected to the output shaft 151a of the motor 151, and said thread is engaged in a shaft with female screw thread 162 fixed to the bottom part of the variable length blade part 140.

With the 9$^{th}$ embodiment, when the screw bar 161 is rotated by the motor 151, for example, in a clockwise direction, the shaft with female screw thread 162 and the variable length blade part 140 fixed thereto moves radially outward as shown with solid line in the drawing to increase the tip diameter of the variable length blade part 140. When the motor 151 is rotated in the reverse direction to rotate the screw bar 161 in a counterclockwise direction, the variable length blade part 140 moves radially inward by stroke S to the position shown with chain line in the drawing resulting in a decreased tip diameter of the variable length blade part 140.

The configuration other than described above is the same as the 8$^{th}$ embodiment and components same as the 8$^{th}$ embodiment are marked with the same reference numerals.

In the 10$^{th}$ embodiment shown in FIG. 13, a blade 100 is divided in two to a blade body 102 fixed to said rotor 1103 and a variable length blade part 150 which define a part of blade from the middle to the tip of the blade 100.

Figures 13A, 13B:
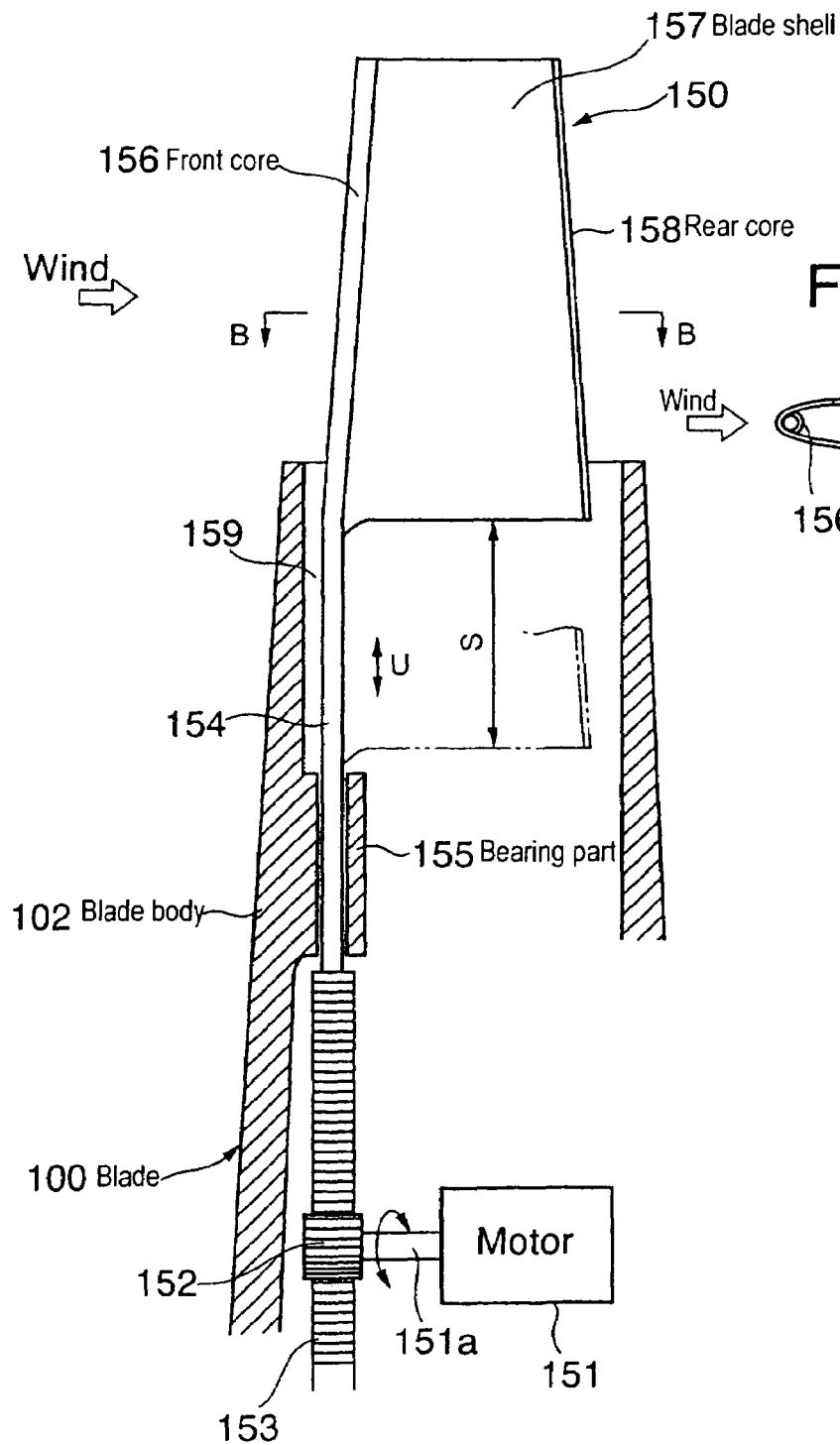
FIG. 13 is a partial transverse sectional view showing the construction of the blade length adjusting mechanism of the $9^{th}$ embodiment, (A) shows the construction, and (B) is a sectional view taken in the direction of arrows B-B of FIG. 13(A).

The variable length blade part 150 is composed of a front core 156 made of hard material such as a metal pipe, a rear core 158 made of wire of soft material, and a blade shell 157 made of flexible thin plate such as high strength cloth and defining a blade profile between the front core 156 and rear core 158 as shown in FIG. 13(B), the front core 156 being extended downward in the longitudinal direction of the blade to form an actuating shaft 154.

The actuating shaft 154 extending from the front core 156 is fit in a bearing part 155 formed in the blade body 102 for sliding in the longitudinal direction of the blade. Reference numeral 159 is a space formed in the blade body for accommodating the variable length blade part 150.

Reference numeral 151 is a reversible motor, 152 is a pinion fixed to an end part of the output shaft 151a of the motor 151. Reference numeral 153 is a rack meshing with the pinion. Said actuating shaft 154 is connected to the rack 153.

When changing the tip diameter of blade, the front core 156 of the variable length blade part 150 is moved along the bearing part 155 formed in the blade body 102 within the range of stroke S by the rotation of the motor 151 via the pinion 152, rack 153, and actuating shaft 154.

With the 10$^{th}$ embodiment, blade profile of the variable length blade part 150 is defined by the blade shell 157 of flexible material covering between the front core 156 and rear core 158, so the variable length blade part 150 is light weighted and it can be folded parallel to the longitudinal direction of the blade.

Referring to showing the configuration of the whole of the 11$^{th}$ embodiment, reference numeral 1103 is a rotor having a plurality of blades 100 (three blades in this example) attached on the periphery thereof at an equal spacing in the circumferential direction and having a rotor shaft 1102 fixed to the rear end thereof. Said blades 100 are each composed of a blade body part 102 fixed to said rotor 1103 and a variable length blade part 140 which is attached to said blade body part 102 capable of being moved radially in the direction of blade length. Reference numeral 1101 is a support for supporting the wind turbine.

Reference numeral 201 is a blade stress detector for detecting stresses acting on said blade 100. It detects the maximum stress occurred in the blade 100 by means of a strain gage stuck on the position where the maximum stress occurs. Reference numeral 202 is a wind speed detector for detecting the speed of wind acting on the wind turbine. Reference numeral 203 is a load detector for detecting the load of the wind turbine such as generator load, which is the output of the wind turbine.

Reference numeral 204 is a rotation speed detector for detecting rotation speed of the rotating components of the wind turbine including the rotor 1103. The detected signals of said stress detector 201, wind speed detector 202, load detector 203, and rotation speed detector 204 are inputted to a blade length control device 205.

Reference numeral 141 is a reversible motor, 207 is a motor controller about which is detailed later.

Figure 17:
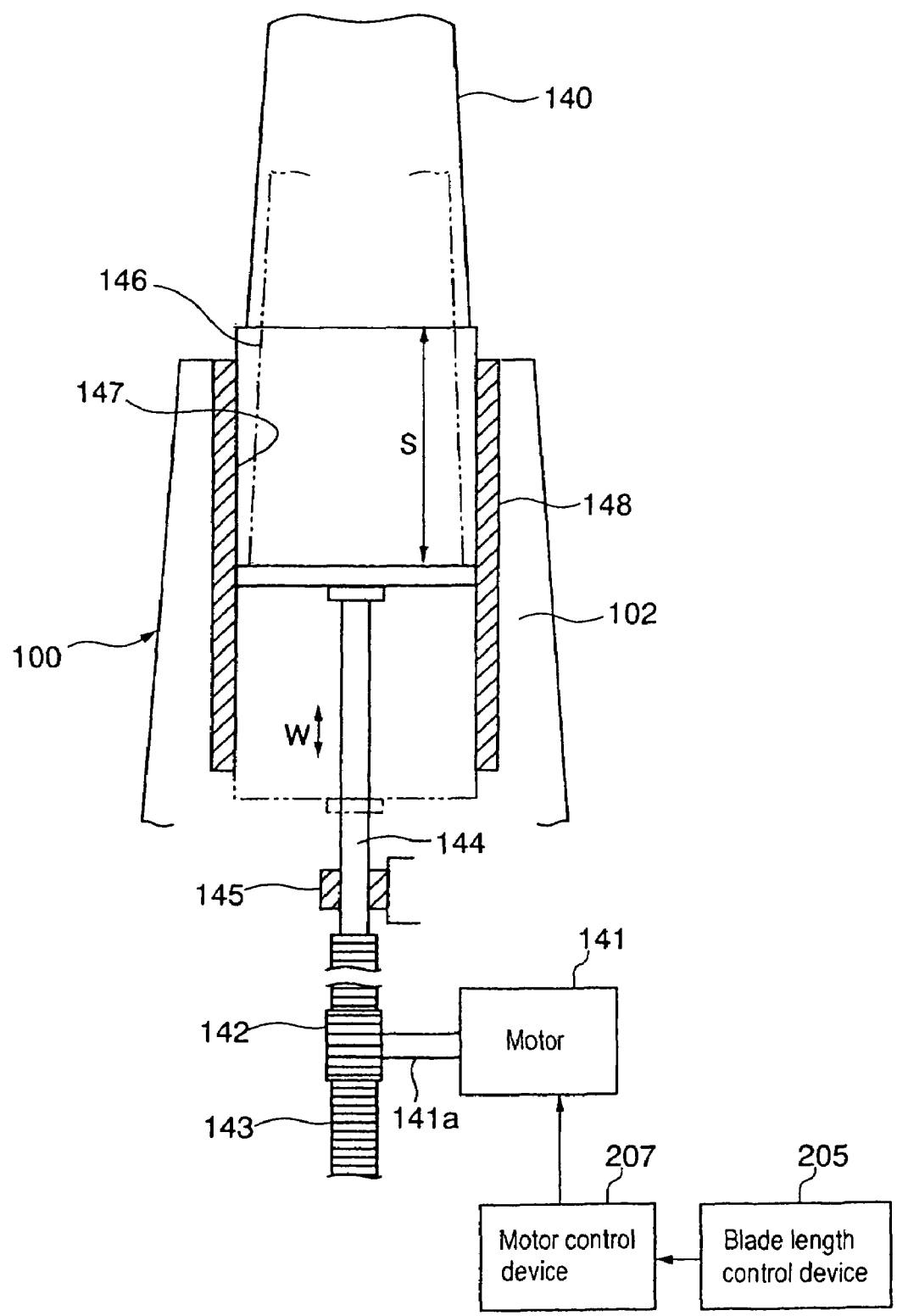
FIG. 17 illustrates when the $8^{th}$ embodiment is equipped with the motor control device and blade length control device for controlling active annular plane area.

In FIG. 17 showing the construction of said blade 100, the blade 100 is divided in two to a blade body 102 fixed to said rotor 1103 and a variable length blade part 140 which define a part of blade from the middle to the tip of the blade 100.

Reference numeral 148 is a pair of slide bearing fixed to the blade body 102. The sliding part 146 formed at the lower portion of the variable length blade part 140 is fit to sliding surfaces of the pair of slide bearings 148 for sliding in the longitudinal direction of blade.

Reference numeral 141 is a reversible motor, 142 is a pinion fixed to the end part of the output shaft 141a of the motor 141. Reference numeral 143 is rack meshing with said pinion 142. Reference numeral 144 is an actuating shaft connected to the rack 143, the other end side of which being fixed to the bottom part of the variable length blade part 140. Reference numeral 145 is a bearing for supporting the actuating shaft 144 by the blade body 102 for rotation.

Reference numeral 205 is a blade length control device the operation of which is detailed later, 207 is a motor control device for controlling the operation of the motor 141 receiving a control signal from the blade length control device 205.

Next, the control operation of the wind turbine of the 11$^{th}$ embodiment will be explained.

Figure 15:
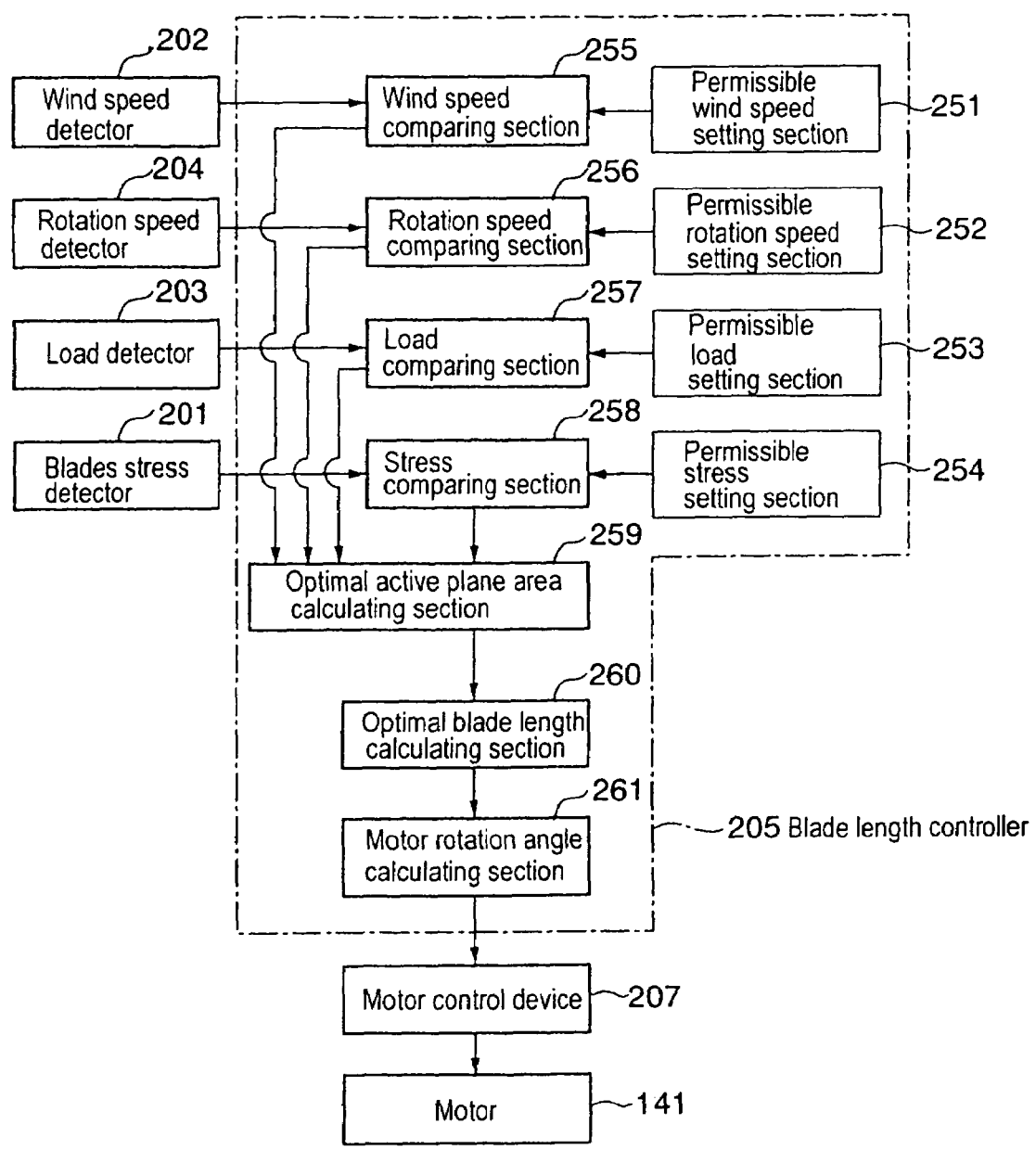
FIG. 15 shows the control block diagram of blade length adjusting mechanism of the $11^{th}$ embodiment according to the present invention.
Figure 16:
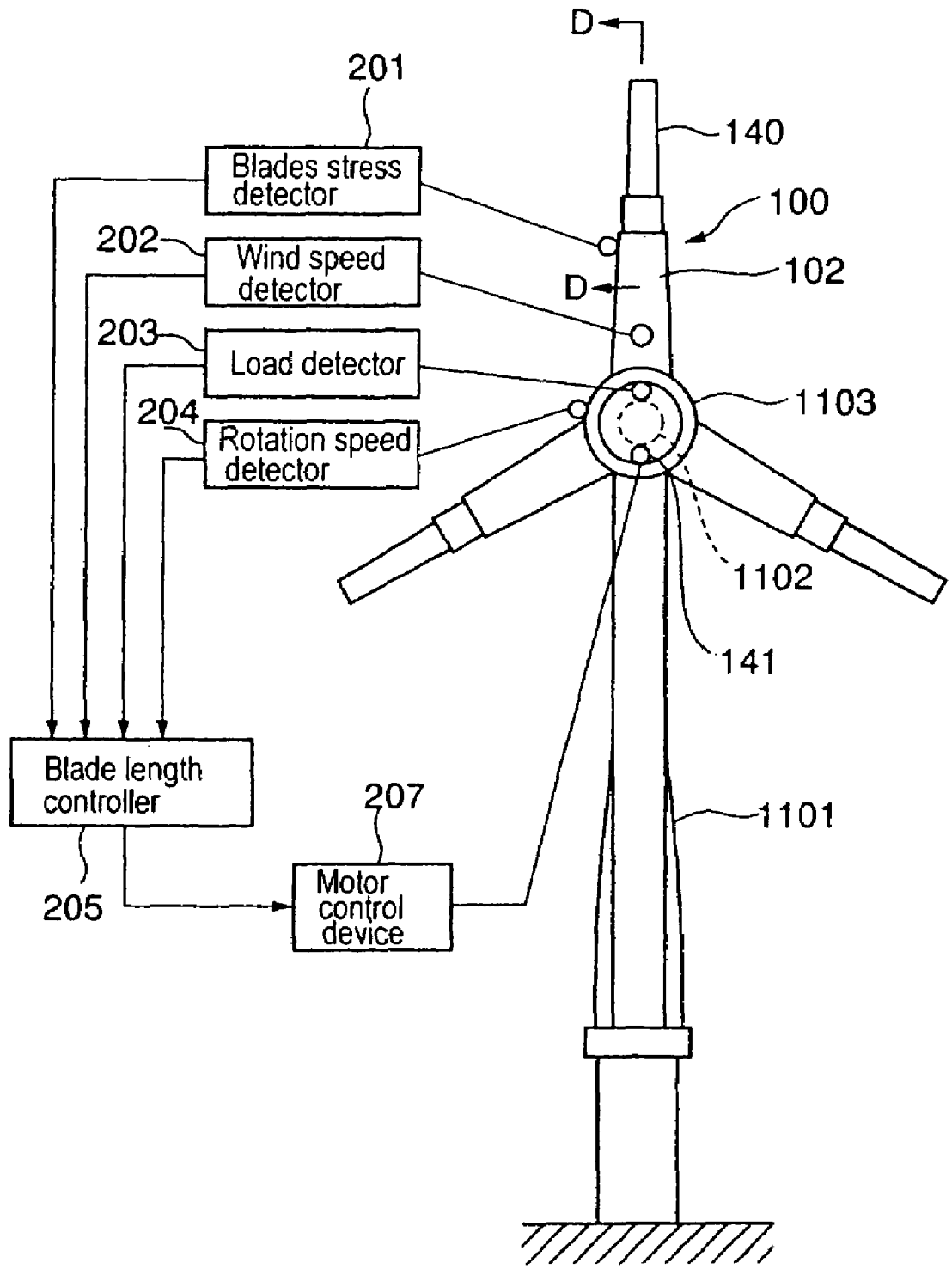
FIG. 16 is a front view of the wind turbine of said $11^{th}$ embodiment showing locations of detectors.

Referring to FIG. 15, reference numeral 205 is a blade length control device. The detected wind speed signal from the wind speed detector 202 is inputted to a wind speed comparing section 255 of the blade length control device 205, the detected rotation speed signal from the rotation speed detector 204 is inputted to a rotation speed comparing section 256, the detected load signal from the load detector 203 is inputted to a load comparing section 257, and the detected stress signal from the blade stress detector 203 is inputted to the stress comparing section 258.

Reference numeral 251 is a permissible wind speed setting section where the permissible wind speed acting on the wind turbine, i.e., optimal wind speed, which is determined based on the stresses of the rotating components including the rotor 100 and the performance of the wind turbine. Reference numeral 252 is a permissible rotation speed setting section where the permissible rotation speed of the rotating components of the wind turbine, i.e., optimal rotation speed, which is determined based on the stresses of the rotating components including the rotor 100 and the performance of the wind turbine. Reference numeral 253 is a permissible load setting section where the optimal load by the generator, etc. (optimal output of the wind turbine), which is determined based on the stresses of the rotating components including the rotor 100 and the performance of the wind turbine. Reference numeral 254 is a permissible stress setting section where the maximum permissible stress acting on the rotor 100 is set.

The wind speed comparing section 255 calculates the deviation of the detected wind speed signal from the maximum value set beforehand in the permissible wind speed setting section 251 and inputs the wind speed deviation (result of comparison) to an optimal active annular plane area calculating section 259. The rotation speed comparison section 256 calculates the deviation of the detected rotation speed signal from the optimal rotation speed set beforehand in the permissible rotation speed setting section 252 and inputs the rotation speed deviation (result of comparison) to the optimal active annular plane area calculating section 259. The load comparing section 257 calculates the deviation of the detected load signal from the optimal load set beforehand in the permissible load setting section 253 and inputs the load deviation (result of comparison) to the optimal active annular plane area calculating section 259. The stress comparing section 258 calculates the deviation of the detected stress signal from the permissible blade stress set beforehand in the permissible stress setting section 254 and inputs the blade stress deviation (result of comparison) to the optimal active annular plane area calculating section 259.

The optimal active annular plane area calculating section 259 calculates the active annular plane area when one or a plurality of the deviations are zero or near zero (Here, near zero means that the detected blade stress is smaller than the permissible blade stress by a small value.), in other words, calculates the active annular plane area to be adjusted to the area with which the wind turbine is operated under the optimal operation condition concerning wind speed, rotation speed, or load. The optimal operation condition for example concerning rotation speed means that the wind turbine is operated with rotation speed at or near the permissible rotation speed.

The optimal active annular plane area calculating section 259 calculates the active annular plane area when the blade stress deviation is zero or near zero and at the same time any one or a plurality of the wind speed deviation, rotation speed deviation, and load deviation, which are deviations of operating conditions, are zero or near zero.

This means that the optimal active annular plane area calculating section 259 calculates the active annular plane area with which the wind turbine is operated under optimal operating condition, i.e., with a maximum output power within permissible blade stress by monitoring and controlling the deviations of operating conditions and the deviation of the blade stress.

An optimal blade length calculating section 260 calculates the value of the length of the variable length blade part 140 to be adjusted corresponding to the value of active annular plane area to be adjusted inputted from the optimal active annular plane area calculating section 259.

A motor rotation angle calculating section 261 calculates the rotation angle of the motor to be rotated in order to adjust the length of blade by the value inputted from the optimal blade length calculating section 260.

Therefore, the blade length control device 205 decreases the length of the variable length blade part 140 to decrease the active annular plane area when detected wind speed is higher than the permissible wind speed, and to increases the length of the variable length blade part 140 to increase the active annular plane area when detected wind speed is lower than the permissible wind speed.

The blade length control device 205 decreases the blade length to decrease the active annular plane area when the detected rotation speed is higher than the permissible rotation speed, and increases the blade length to increase active annular plane area when the detected rotation speed is lower than the permissible rotation speed.

The blade length control device 205 decreases the blade length to decrease the active annular plane area when the detected load is heavier than the permissible load, and increases the blade length to increase the active annular plane area when the detected load is lower than the permissible load.

The blade length control device 205 decreases the blade length to decrease the active annular plane area when the detected blade stress is higher than the permissible blade stress, and increases the blade length to increase the active annular plane area when the detected stress is lower than the permissible load, in addition to controlling the blade length in correspondence to wind speed, rotation speed, and load.

The rotation angle signal for rotating the reversible motor 141 calculated in the motor rotation angle calculating section 261 is inputted to the motor control device 207, which allows the motor 141 to rotate by an angle corresponding to said rotation angle signal.

As shown in FIG. 17, which shows an example of adjusting blade length in the case of the embodiment of FIG. 11, when the pinion 142 is rotated in the normal or reverse direction by the reversible motor 141, the rack 143 meshing with the pinion 142 and the actuating shaft 144 fixed to the rack 143 reciprocates in the direction of double arrow W. By the reciprocating movement of the actuating shaft 144, the variable length blade part 140 fixed to the actuating shaft 144 slides in the in the longitudinal direction of blade with the sliding portion 146 guided along the slide bearing 148.

That is, when the actuating shaft 144 is moved upward by the rotation of the motor 141, the variable length blade part 140 moves radially outward to be increased in tip diameter thereof.

When the actuating shaft 144 is pulled down by the rotation of the motor 141 in the reverse direction, the variable length blade part 140 moves radially inward by stroke S to the position shown with chain line in the drawing, resulting in a decreased tip diameter of the variable length blade part 140.

Therefore, according to the embodiment, the active annular plane area of the blade 100 can be varied by sliding the variable length blade part 140 fit in the blade body 102 for sliding upward or downward in FIG. 17.

As described above, according to the 11$^{th}$ embodiment, the output of the wind turbine can be maintained always in the maximum output level by controlling the active annular plane area so that the area is optimal in correspondence to the operating conditions of the wind turbine such as wind speed, rotation speed and load of the wind turbine by means of operation control through the blade length control device 205.

Further, as it becomes possible to control the length of variable length blade part 140 so that the active annular plane area is optimal for both the permissible values of wind speed, rotation speed and load of the wind turbine and the permissible value of blade stress, the occurrence of excessive stress in the rotating components of the wind turbine due to rapid increase of wind speed and load, etc., is avoided and fatigue failure of the rotating elements can be prevented.

Therefore, the wind turbine can be operated while always automatically controlling the length of the variable length blade part 140 so that the occurrence of fatigue failure of the rotating components, such as the blades 100 and rotor 1103, and at the same time the wind turbine is operated with the optimal active annular plane area which ensures a maximum output of the wind turbine while avoiding the fatigue failure. Accordingly, the operation of the wind turbine is possible with an optimal maximum output with an extended fatigue life of the rotating elements such as the blades and rotor.

Figure 18:
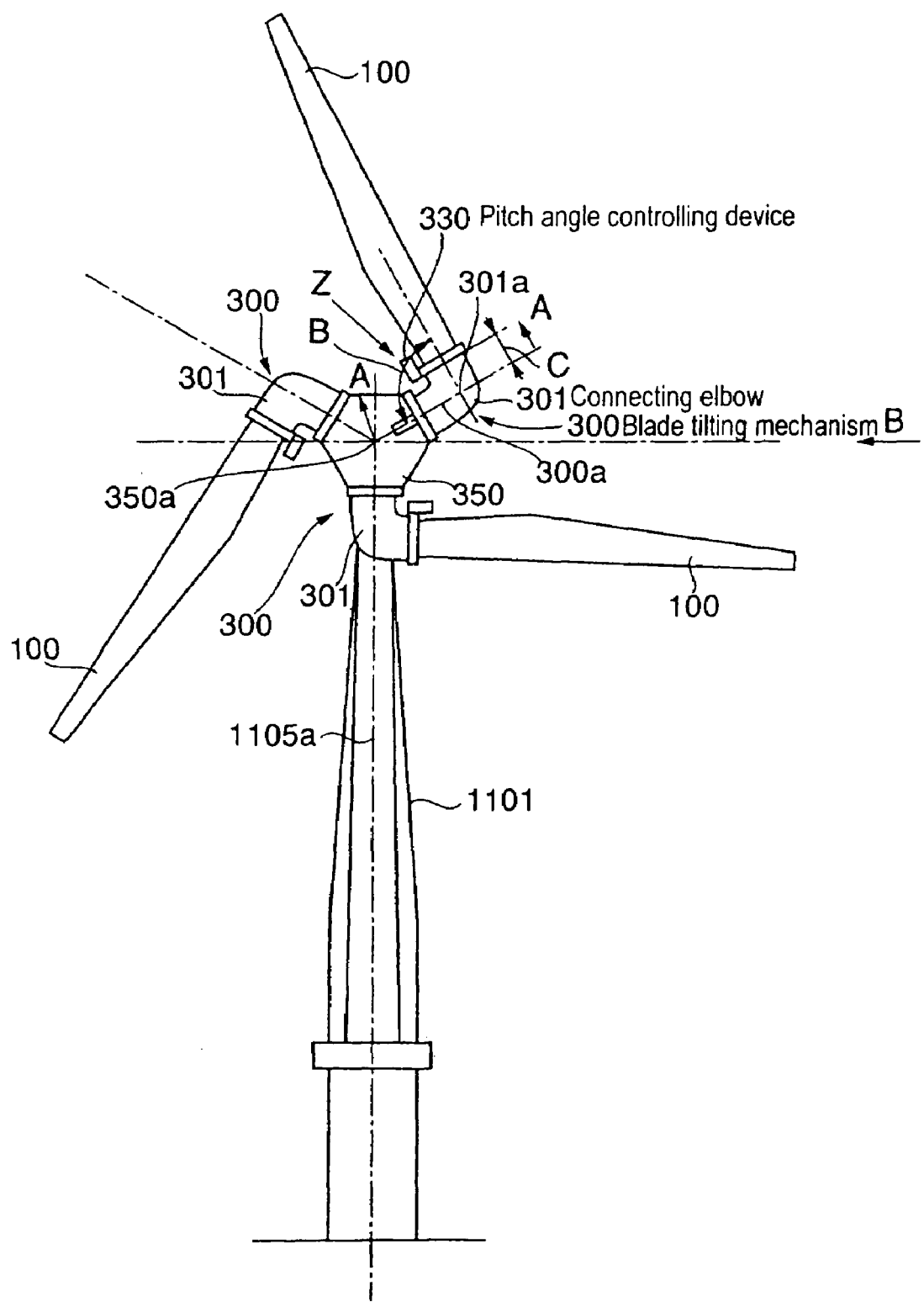
FIG. 18 is a front view of the $12^{th}$ embodiment of the wind turbine according to the present invention.
Figure 19:
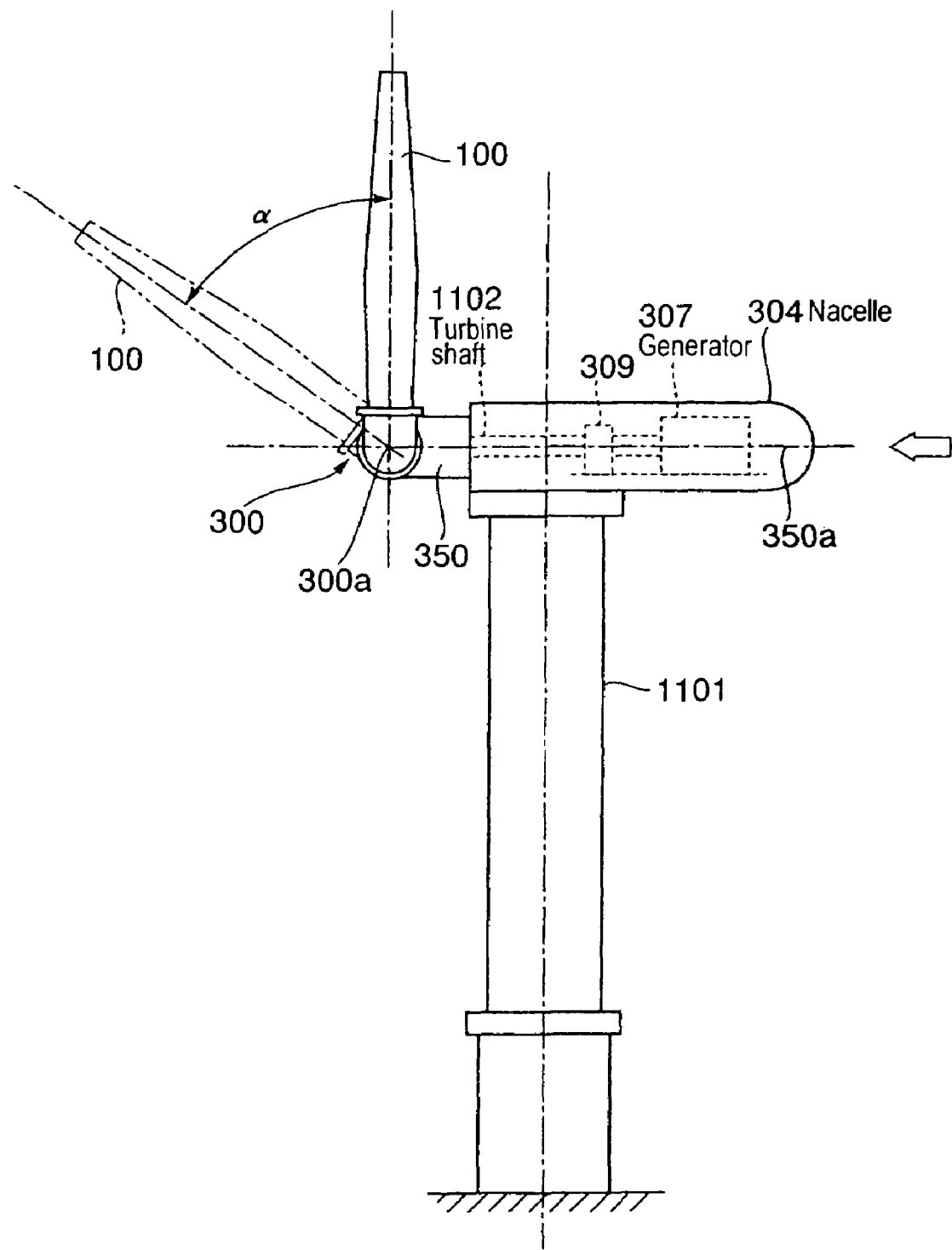
FIG. 19 is a side view of the wind turbine of FIG. 18 viewed in the direction of arrow B of FIG. 18
Figure 20:
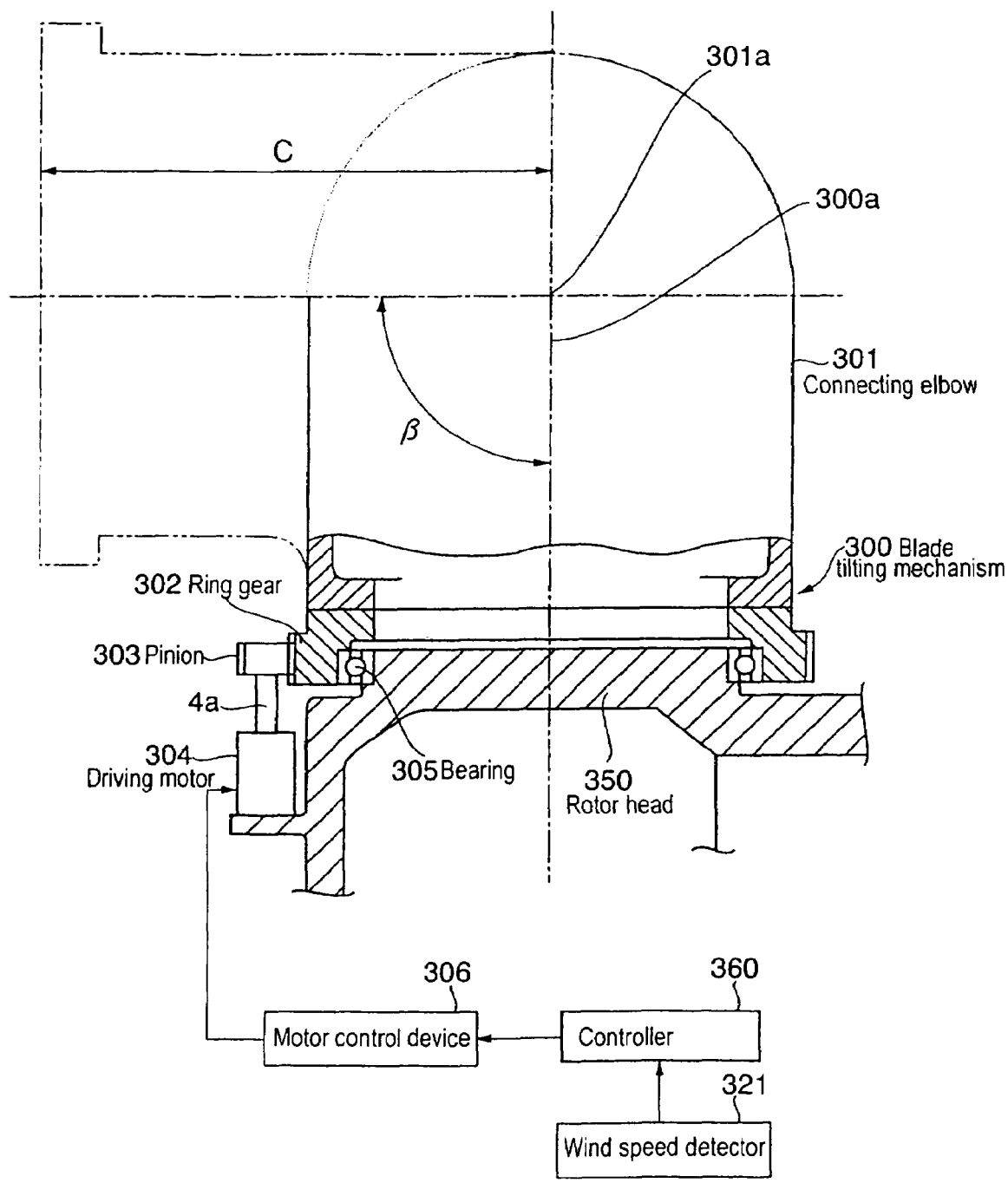
FIG. 20 is an enlarged sectional view taken in the direction of arrows A-A of FIG. 18.

Referring to FIGS. 18-20 showing the 12$^{th}$ embodiment, reference numeral 1101 is a support, 304 is a nacelle supported on said support 1101 via a well known yaw control device (not shown is the drawing) for rotation around the axis of rotation 350a of the nacelle 304, an electric generator 307 being accommodated in the nacelle 304. Reference numeral 1102 is a turbine shaft connecting a rotor head 350 to the generator 307, 309 is a bearing for supporting the turbine shaft 1102 by the nacelle 304.

A plurality of connecting elbows (three of elbows in this example) is attached to said rotor head 350 at an equal spacing in the circumferential direction by the means described later, and a blade is attached to each of the connecting elbows 301.

Although the wind turbine is configured in a downwind type with the rotor head 350 and blades 100 positioned down the wind from the axis of rotation 1105a of the nacelle, it is suitable to configure the wind turbine in an upwind type with the rotor head 350 and blades 100 positioned toward the wind from the axis of rotation 1105a of the nacelle.

Reference numeral 300 is a blade tilting mechanism as described below.

Reference numeral 301 is a connecting elbow, a hollow tube (it may be a solid body) bent by an angle β in the plane perpendicular to the axis of rotation 350a of the rotor head 350 into L like shape. Said angle β is suitable to be 90°, however, it may be an obtuse angle between 90° and about 120°.

Referring to FIG. 20 showing the structure of attaching part of the connecting elbow 301 for attaching to the rotor head 350, reference numeral 302 is an external ring gear fixed to the lower part of the connecting elbow 301 concentric with the axis of rotation 301a thereof. Reference numeral 303 is a pinion fixed to the end part of the output shaft 304a of a driving motor 304 and meshes with the ring gear 302.

Reference numeral 305 is a bearing attached between the inner periphery of the ring gear 302 and the outer periphery of the rotor head 350. An end of the connecting elbow 301 is fixed to the ring gear 302, and they are rotatable about the center axis of 300a of the rotor head 350 via the bearing 305.

The blade 100 is attached to the other end of the elbow 301 for rotation as described below.

Figure 21:
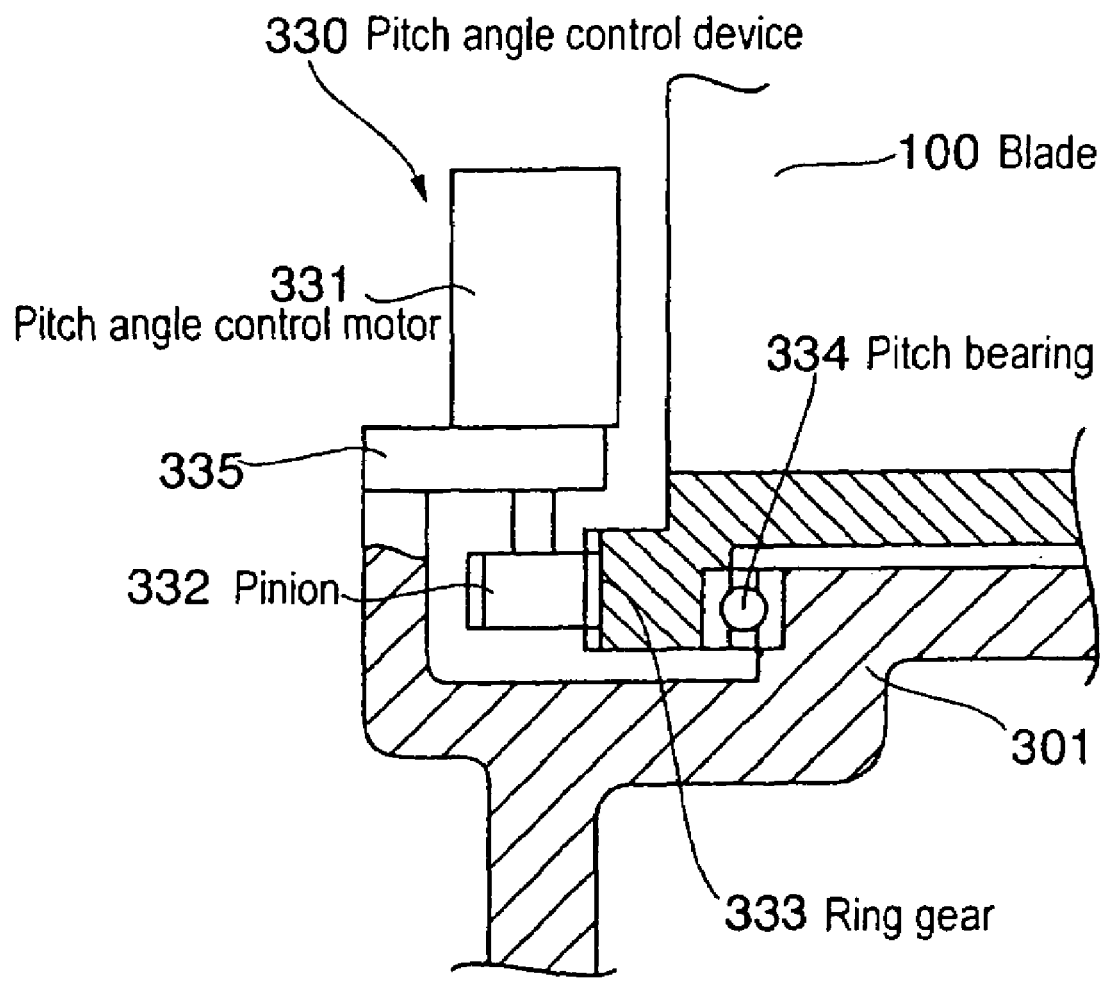
FIG. 21 is an enlarged detailed sectional view of portion Z of FIG. 18, showing the detail of the pitch angle control device.

Referring to FIG. 21 showing the detail of a pitch angle controlling device 330, reference numeral 333 is an external ring gear fixed to the lower end of the blade 100, 334 is a bearing attached between the inner periphery of the ring gear 333 and the other end of the connecting elbow 301. The blade 100 is rotatable relative to the connecting elbow 301 via the bearing 334 to adjust blade pitch angle to a desired angle.

Reference numeral 331 is a pitch angle control motor fixed to the connecting elbow near the periphery of the other end thereof by means of a bracket 335. Reference numeral 332 is a pinion fixed to the output shaft of the pitch angle control motor 331 and meshes with the external ring gear 333.

Therefore, in the pitch angle control device 330, the ring gear 333 is rotated by the pitch angle control motor 331 via the pinion 332 and the blade 100 fixed to the ring gear 333 can be fixed in the desired pitch angle position.

With this construction, maintainability of the pitch angle control device 330 is enhanced as the ring gear 333 is of a external gear.

Returning to FIG. 20, reference numeral 306 is a motor control device for controlling the driving motor 304, 321 is a wind speed detector for detecting the wind speed acting on the blades 100, and 360 is a controller which calculates the tilt angle of the connecting elbow, i.e., the tilt angle of the blade 100 based on the detected wind speed from the wind speed detector 321 and output the result to the motor control device 306.

Figure 22A:
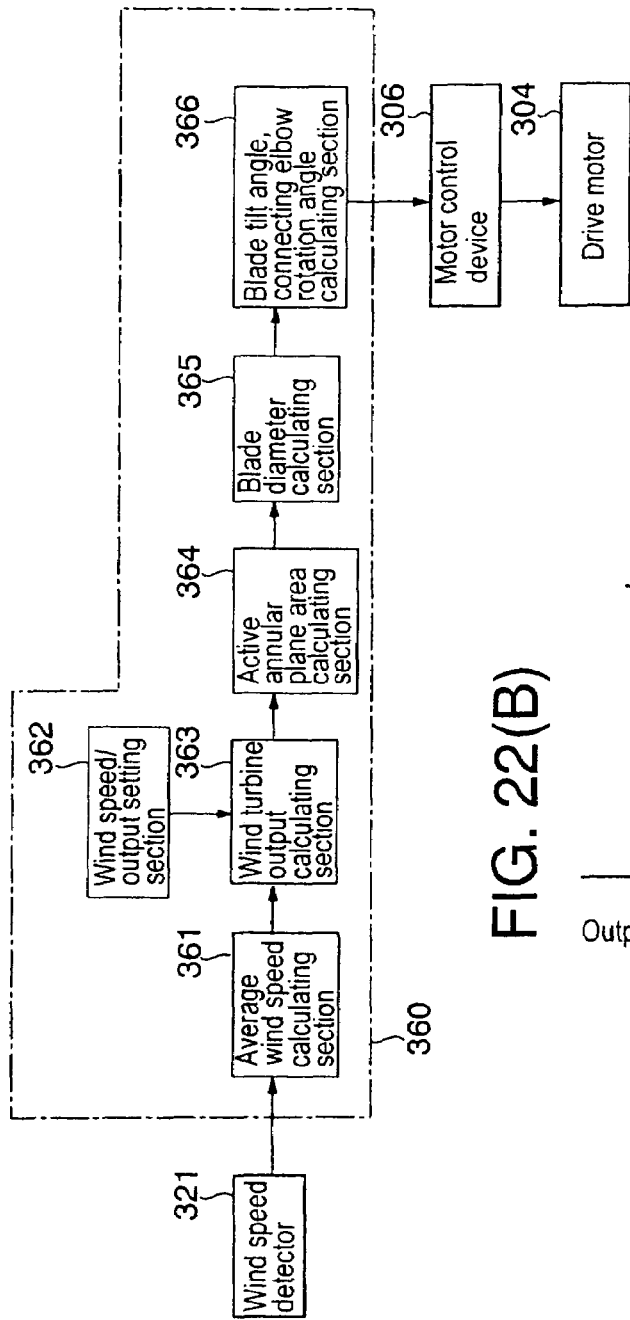
FIG. 22(A) is a control block diagram of the active annular plane area adjusting device.

When operating the wind turbine of the 12$^{th}$ embodiment, the detected wind signal of the wind speed acting on the blade is inputted to a average wind speed calculating section 361 of the controller 360 as shown in FIG. 22.

The average wind speed calculating section 361 calculates average wind speed V during a determined time period and input it to a wind turbine output calculating section 363.

Reference numeral 362 is a wind speed/output setting section where is set a lower limit average wind speed $V_2$ and a higher limit wind speed $V_1$. When average speed V is lower than $V_2$ the tilt angle of the blade 100 (see FIG. 19) is kept to zero, that is the blade tilt position of maximum active annular plane area, when average wind speed V is higher than $V_1$, limit speed of higher side, the tilt angle α of the blade 100 is kept to the minimum angle to reduce the active annular plane area to a minimum.

Figure 22B:
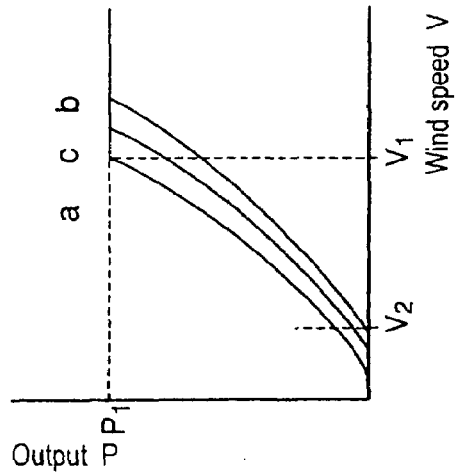
FIG. 22(B) is a graph showing output curves of the wind turbine.

In a wind turbine output power calculating section 363 is set the relations between average wind speed V and wind turbine output P as shown in FIG. 22(B). Each of the curves a, c, and b shows the relation between wind speed and the output of wind turbine with constant active annular plane area.

When average wind speed V is medium between $V_2$ and $V_1$, the output P at the intersection of the curve c in FIG. 22(B) and the vertical line of the average wind speed which is between $V_2$ and $V_1$ is selected (calculated) in the wind turbine output power calculating section 363 and said selected (calculated) power P is inputted to an active annular plane area calculating section 364.

The active annular plane area calculating section 364 calculates the active annular plane area S corresponding to said selected (calculated) wind turbine output P and inputs the result to a blade diameter calculating section 365. The blade diameter calculating section 365 calculates the blade tip diameter corresponding to said calculated active annular plane area S and output the result to a blade tilt angle/connecting elbow rotation angle calculating section 366.

The blade tilt angle/connecting elbow rotation angle calculating section 366 calculates the required tilt angle for realizing said calculated blade tip diameter and further calculates the required rotation angle of the connecting elbow 301 for realizing the rotation of the blade to the position of said tilt angle α, and inputs the calculated rotational angle of the connecting elbow 301 to the motor control device 306.

The motor control device 306 allows the drive motor 304 to be rotated to rotate the connecting elbow 301 to the position of said calculated angle α and to be kept in the position.

In FIG. 22(B), only a single curve c is set for average wind velocity V between the lower limit wind speed $V_2$ and higher limit wind speed $V_1$, a plurality of curves may be set for a plurality of average wind speed ranges between $V_2$ and $V_1$.

As described above, according to the $12^{th}$ embodiment, when average wind speed V is lower than a predetermined lower limit of average wind speed $V_2$, the active annular plane area is increased to the maximum by erecting the blades 100 to the vertical position as shown with solid line in FIG. 19 to get the most out of the wind energy. In this case, as wind speed is low, fatigue failure does not occur in the rotating components such as the blades 100 and rotor head 350 by increasing the active annular plane area to increase the amount of wind energy of wind taken in to the wind turbine.

When the average wind speed V is higher than predetermined higher limit of average wind speed $V_1$, the tilt angle α of the blades 100 is increased as shown with chain line in FIG. 19 to decrease the active annular plane area to avoid the occurrence of fatigue failure in the rotating components.

Further, when wind speed is between $V_2$ and $V_1$, the energy of wind taken-in to the wind turbine is adjusted by changing the tilt angle α of the blades 100 according to curve c in FIG. 22(B), where curve c may be a plurality of curves corresponding to a plurality of average speed ranges between $V_2$ and $V_1$ as mentioned above, and the wind turbine is operated under optimal operating condition taking into consideration fatigue failure in the rotating components.

By this, the operation of the wind turbine is possible with the blades set to the position of tilt angle α corresponding to an active annular plane area with which the output of the wind turbine is a maximum within the range of evading the occurrence of fatigue failure in the rotating components such as the blades 100 and rotor head 350.

Further, by changing the distance C in FIG. 20, that is the distance from the axis of rotation of the connecting elbow 301 to the end face for attaching the blade 100, the tip diameter of the blade can be changed. Therefore, by preparing connecting elbows of different length C, active annular plane area can be changed only by changing the connecting elbow 301 without preparing blades of different blade length.

Figure 23:
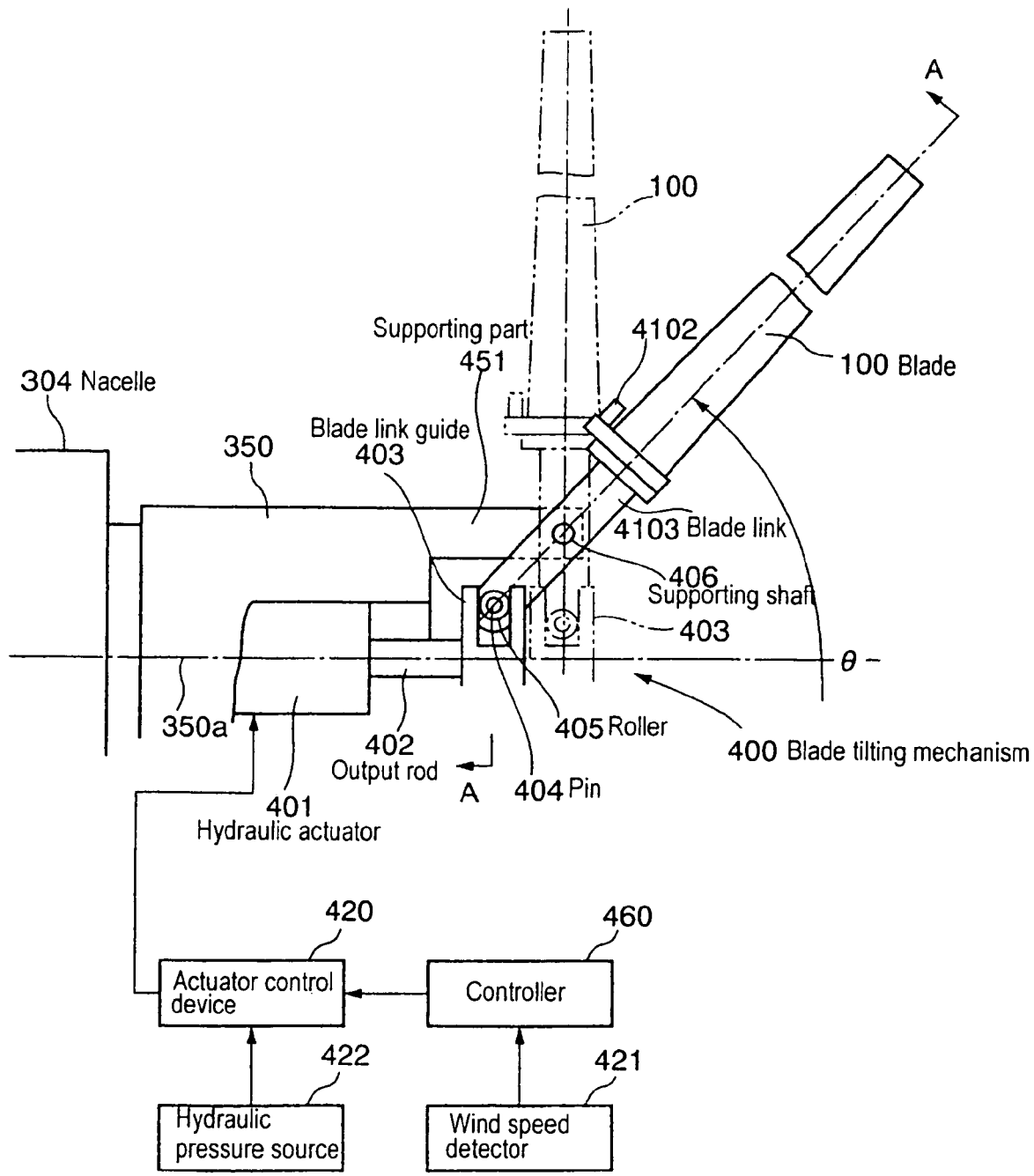
FIG. 23 is a partial sectional view of the active annular plane area adjusting device of the $13^{th}$ embodiment of the wind turbine according to the present invention (sectional view taken in the direction of arrows B-B of FIG. 24).

FIG. 23 illustrates schematically the side view of wind turbine of the $13^{th}$, $14^{th}$, and $15^{th}$ embodiment. In the drawing, a plurality of blades 100 are attached to a rotor head 350 by means of the mechanism described later. Reference numeral 1101 is a support on the top of which a nacelle 304 is mounted by means of a yaw control device 4106 which is well known.

In the nacelle 304 is accommodated an electric generator 307. Reference numeral 1102 is a turbine shaft for connecting the rotor head 350 to the generator 307, 309 is a bearing for supporting the turbine shaft 1102 by the nacelle 304.

Although the wind turbine is configured in a downwind type with the rotor head 350 and blades 100 positioned down the wind from the axis of rotation 1105a of the nacelle, it is suitable to configure the wind turbine in an upwind type with the rotor head 350 and blades 100 positioned toward the wind from the axis of rotation 1105a of the nacelle.

Figure 24:
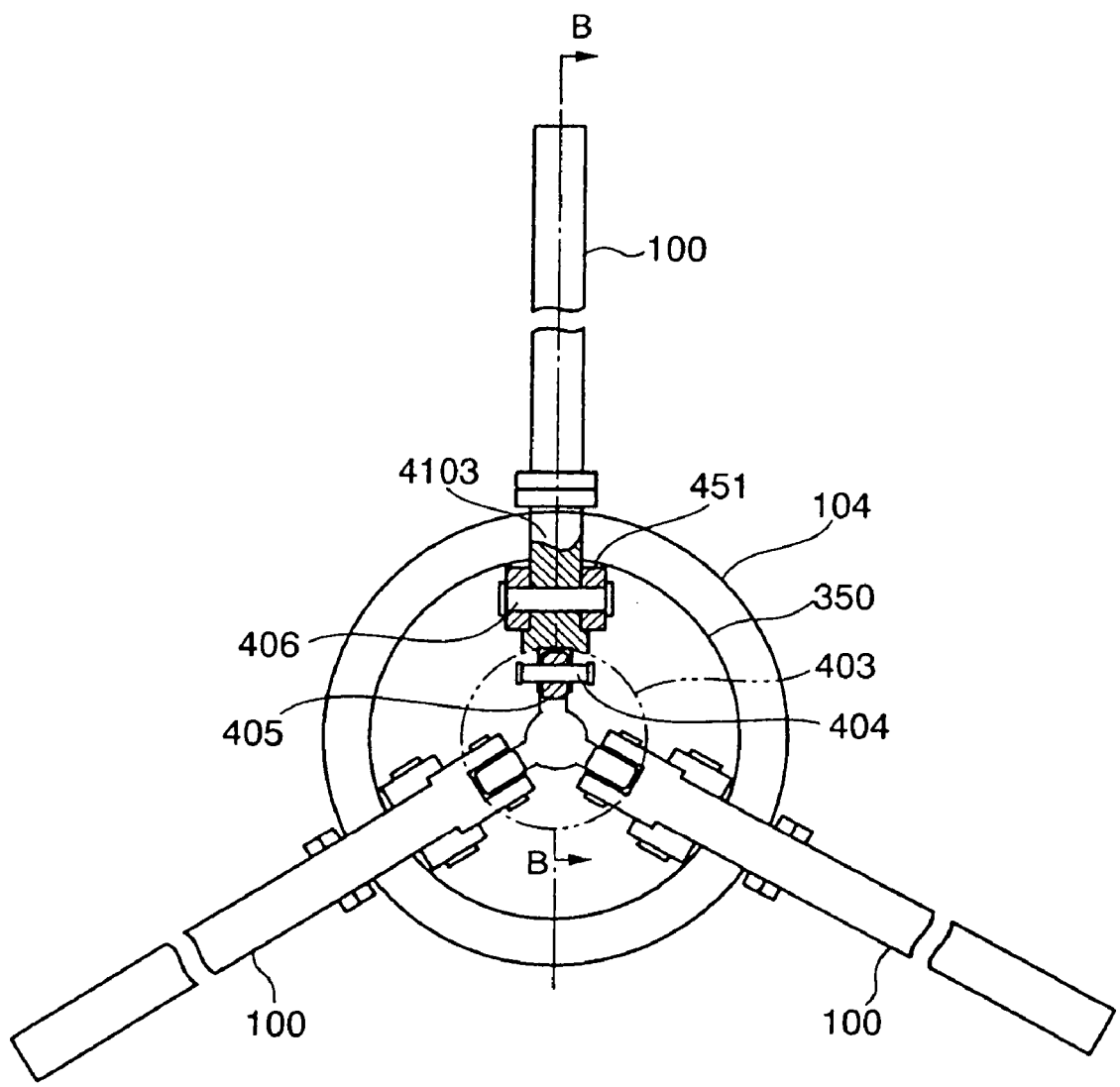
FIG. 24 is a front view of the active annular plane area adjusting device of FIG. 23 with a partially sectional view in the direction of arrow A-A of FIG. 23.

Referring to FIG. 23, 24 showing the $13^{th}$ embodiment, reference numeral 100 represents the blades attached to the rotor head 350 by the means described below, three blades being attached as shown in FIG. 24 (a plurality of blades other than three may be suitable).

Reference numeral 400 is a blade tilting mechanism composed as follows.

Reference numeral 4103 is a blade link, an end of which is attached to the blade 100 via a pitch angle control device 4102. The blade link 4103 is supported at its middle part by the forked supporting part 451 formed at an end part of the rotor head 350 via a supporting shaft 406 for swinging.

Reference numeral 401 is a hydraulic actuator fixed to the rotor head 350, the output rod 402 of the actuator being movable in the direction of the axis of rotation 350a of the rotor head 350. Reference numeral 403 is a blade link guide having protruded portions in each of which a groove is defined for receiving each of rollers 405 which is fit for rotation to each of pins 404 fixed to the other end part of each of the blade links 4103.

With this construction, each blade link 4103, accordingly each blade 100 is swung around the supporting shaft 406 via the blade link guide 403 and roller 404 when the output rod 402 of the hydraulic actuator 401 moves in the direction of the axis of rotation of the rotor head 350.

Reference numeral 421 is a wind speed detector for detecting the wind speed acting on the blades 100, 460 is a controller which calculates the tilt angle θ of the blade 100 based on the detected wind speed from the wind speed detector 421 and outputs the result to an actuator control device 420 which drives the hydraulic actuator 401 on receiving the control signal from the controller 460, and 422 is a hydraulic source of the hydraulic actuator 401.

Figure 28A:
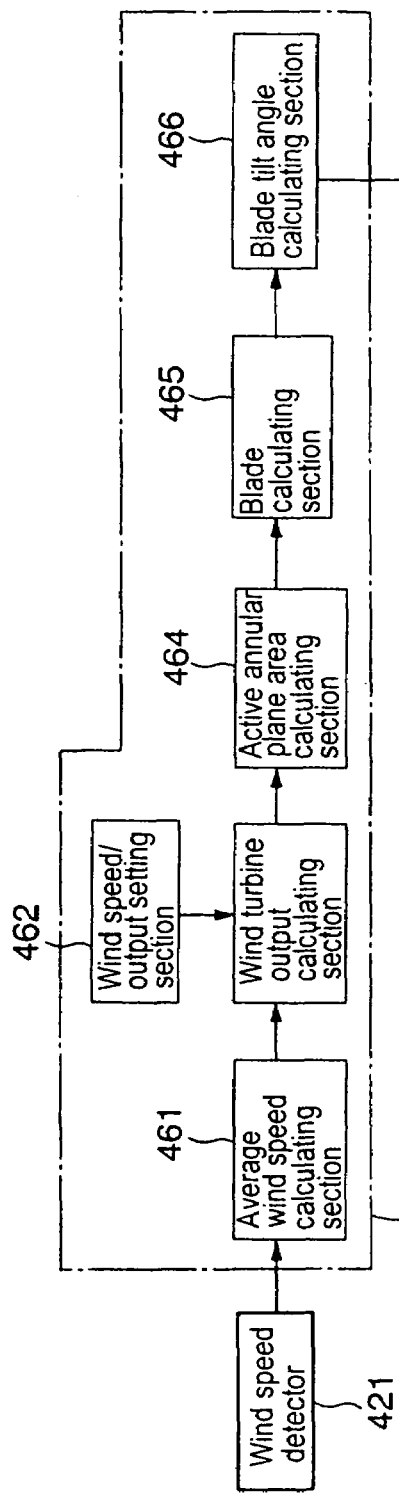
FIG. 28(A) is a control block diagram of the active annular plane area adjusting device according to the present invention.

In the operation of the wing turbine of the $13^{th}$ embodiment, as shown in FIG. 28, the detected signal of the wind speed acting on the blades 100 detected by the wind speed detector 421 is inputted to an average wind speed calculating section 461, which calculates the average wind speed V during a determined time period and inputs the result to a wind turbine output calculating section 463.

Reference numeral 462 is a wind speed/output setting section where is set a lower limit average wind speed $V_2$ and a higher limit wind speed $V_1$. When average speed V is lower than $V_2$ the tilt angle θ of the blade 100 (see FIG. 23, 25, 26) is kept to 180°, that is the blade tilt position of a maximum active annular plane area, when average wind speed V is higher than $V_1$, limit speed of higher side, the tilt angle θ of the blade 100 is kept to the minimum angle to reduce the active annular plane area to the minimum.

Figure 28B:
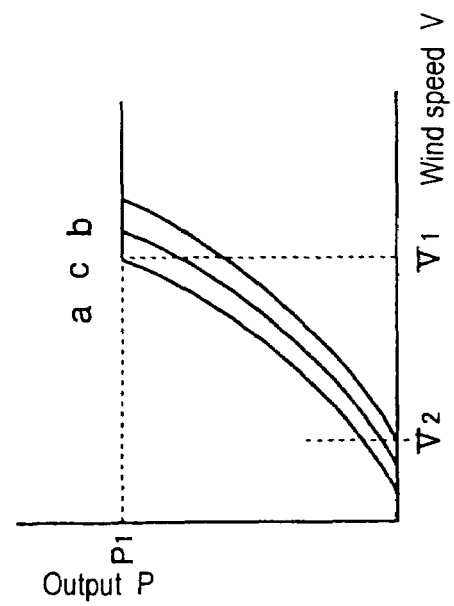
FIG. 28(B) is a graph showing output curves of the wind turbine.

In a wind turbine output power calculating section 463 is set the relations between average wind speed V and wind turbine output P as shown in FIG. 28(B). Each of the curves a, c, and b shows the relation between wind speed and the output of wind turbine with constant active annular plane area.

When average wind speed V is medium between $V_2$ and V, the output P at the intersection of the curve c in FIG. 22(B) and the vertical line of the average wind speed which is between $V_2$ and $V_1$ is selected (calculated) in the wind turbine output power calculating section 463 and said selected (calculated) power P is inputted to an active annular plane area calculating section 464.

The active annular plane area calculating section 464 calculates the active annular plane area S corresponding to said selected (calculated) wind turbine output P and inputs the result to a blade diameter calculating section 465. The blade diameter calculating section 465 calculates the blade tip diameter corresponding to said calculated active annular plane area S and output the result to a blade tilt angle/connecting elbow rotation angle calculating section 466.

The blade tilt angle calculating section 466 calculates the required tilt angle θ for realizing said calculated blade tip diameter and output the result to an actuator control device 420, which controls the supply/exhaust of the working fluid to or from the actuator 401 to move the output rod 402 so that the blades 100 are tilted by an angle θ calculated based on the average wind speed V and allows the blade to be kept in the position of the angle θ.

In FIG. 28(B), only a single curve c is set for average wind velocity V between the lower limit wind speed $V_2$ and higher limit wind speed $V_1$, a plurality of curves may be set for a plurality of average wind speed ranges between $V_2$ and $V_1$.

As described above, according to the 13$^{th}$ embodiment, when average wind speed V is lower than a predetermined lower limit wind speed $V_2$, the active annular plane area is increased to the maximum by erecting the blades 100 to the vertical position (θ=180°) as shown with chain line in FIG. 23 to get the most out of the wind energy. In this case, as wind speed is low, fatigue failure does not occur in the rotating components such as the blades 100 and rotor head 350 by increasing the active annular plane area to increase the energy of wind taken in to the wind turbine.

When the average wind speed V is higher than higher limit wind speed $V_1$, the tilt angle θ of the blades 100 is decreased, as shown with a solid line in FIG. 23, to decrease the active annular plane area to avoid the occurrence of fatigue failure in the rotating components.

Further, when wind speed is medium between $V_2$ and $V_1$, the energy of wind taken-in to the wind turbine is adjusted by changing the tilt angle θ of the blades 100 according to curve c in FIG. 22(B), where curve c may be a plurality of curves corresponding to a plurality of average speed ranges between $V_2$ and $V_1$ as mentioned above, and the wind turbine is operated under optimal operating condition taking into consideration fatigue failure in the rotating components.

By this, the operation of the wind turbine is possible with the blades set to the position of tilt angle θ corresponding to an active annular plane area with which the output of the wind turbine is maximum within the range of evading the occurrence of fatigue failure in the rotating components such as the blades 100 and rotor head 350.

Figure 25:
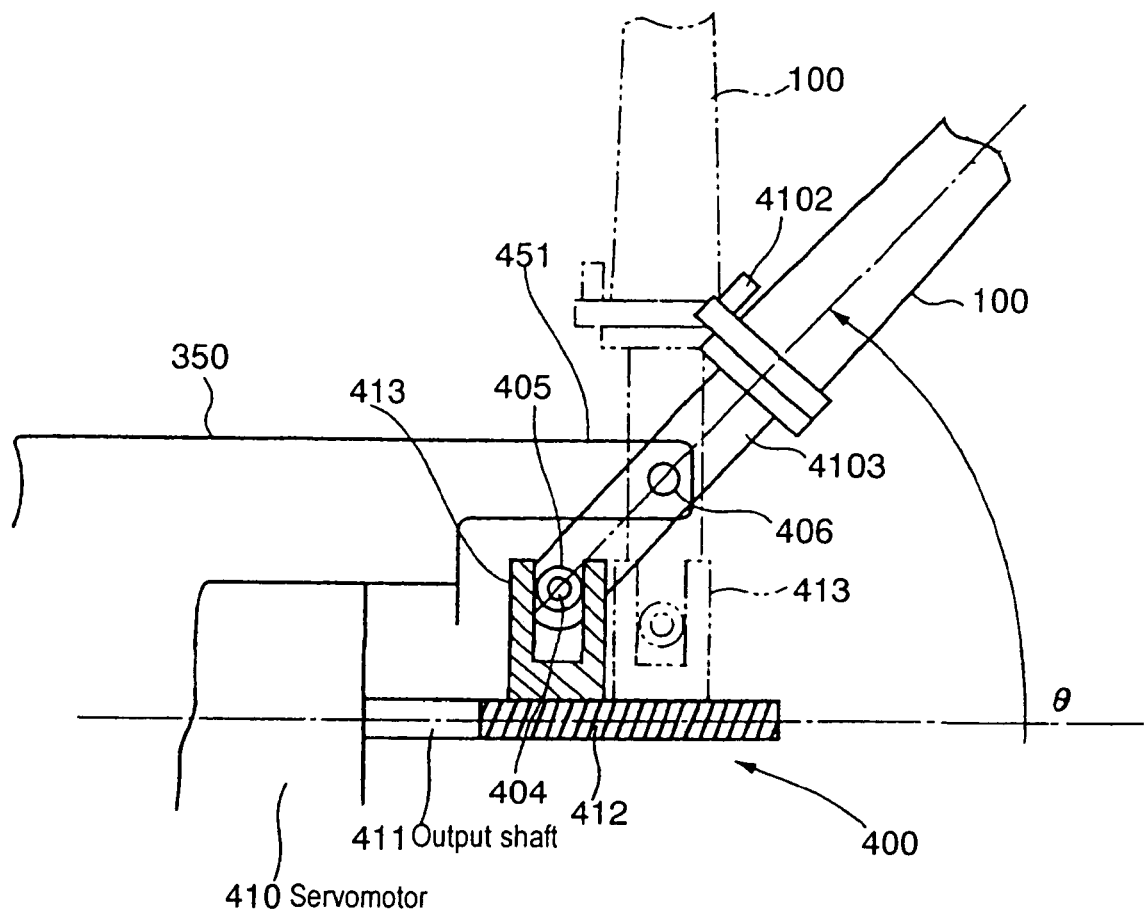
FIG. 25 is a partial sectional view of the active annular plane area adjusting device of the $14^{th}$ embodiment, corresponding to FIG. 23.
Figure 26:
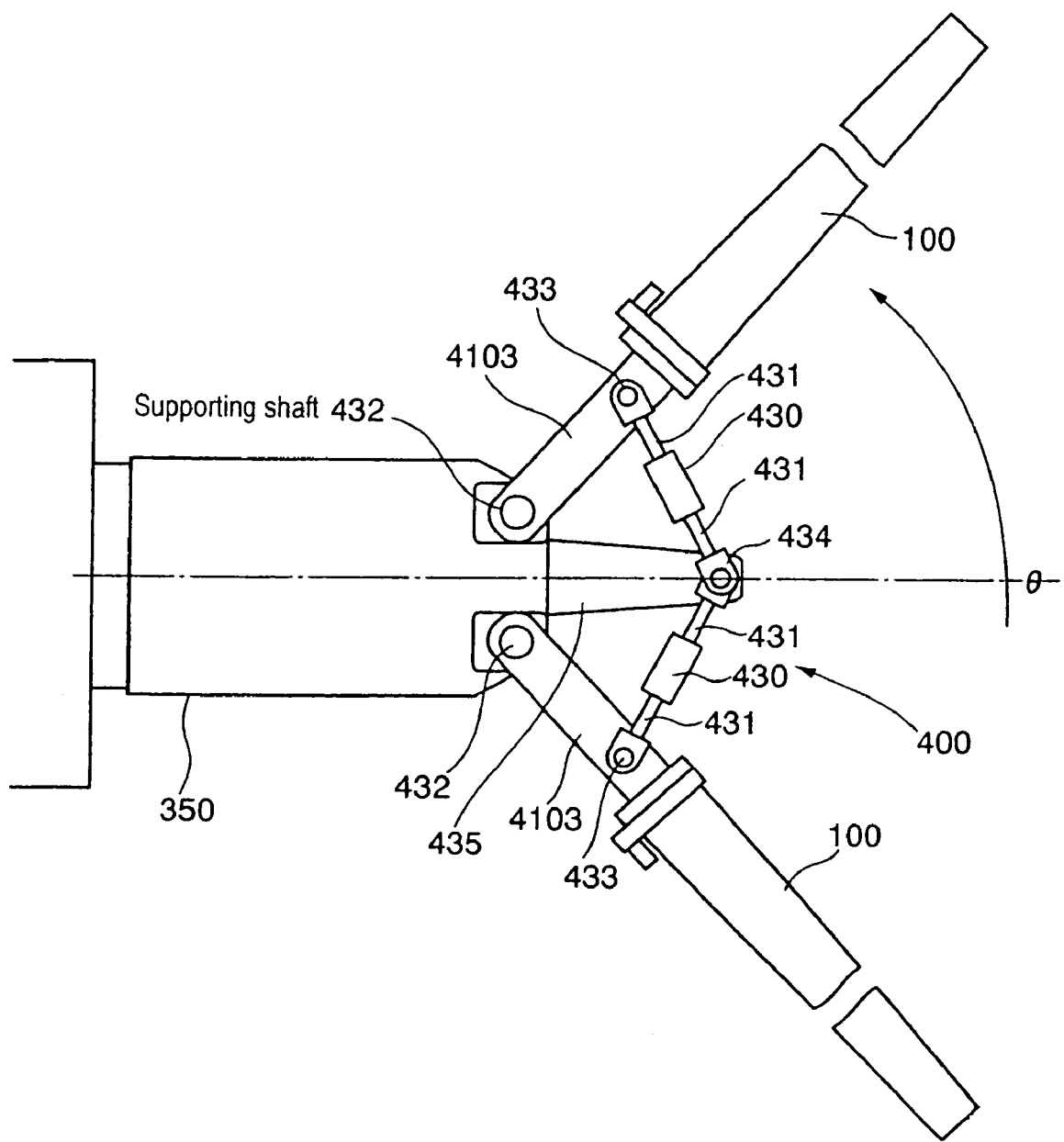
FIG. 26 is a partial sectional view of the active annular plane area adjusting device of the $15^{th}$ embodiment, corresponding to FIG. 23.
Figure 27:
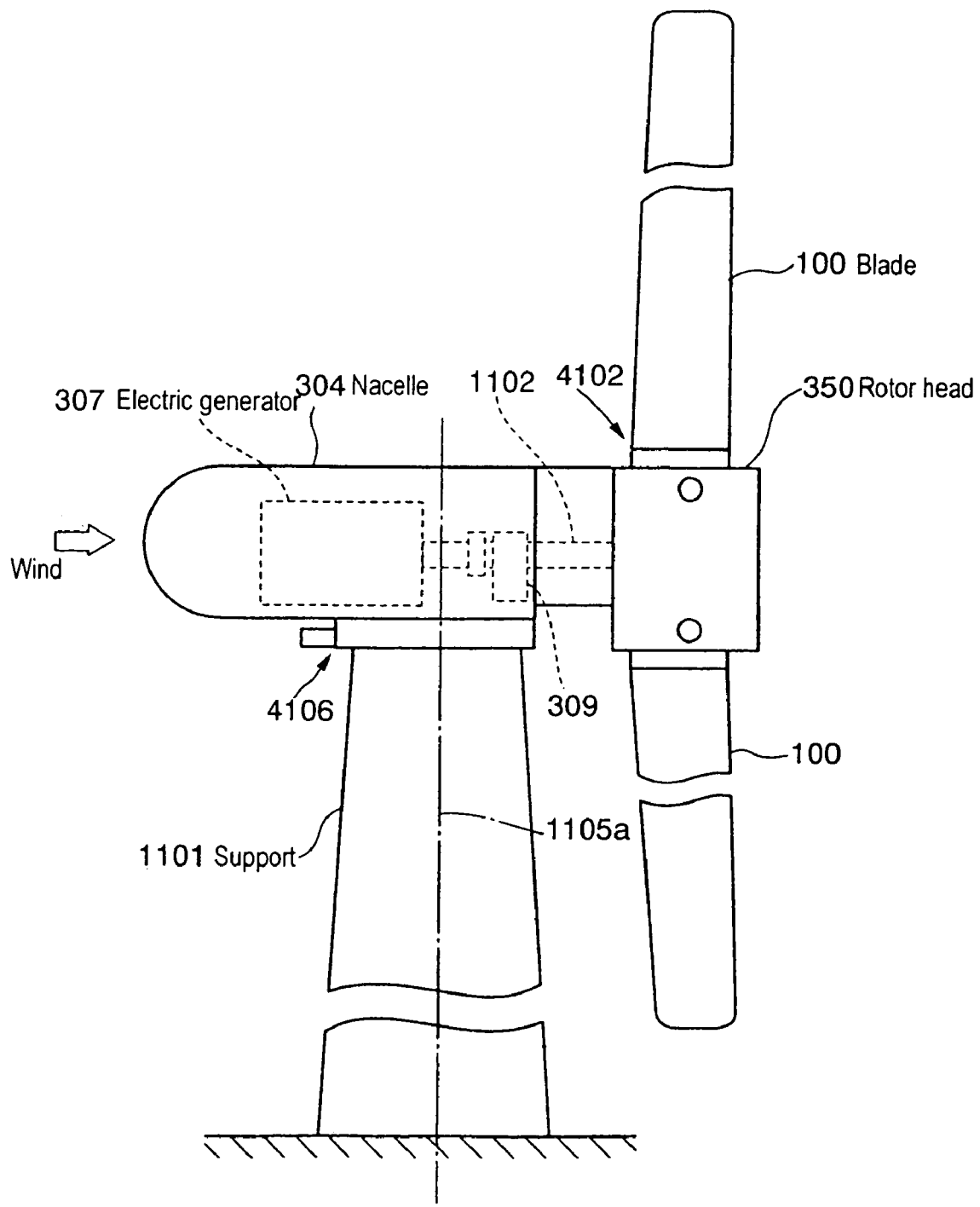
FIG. 27 is a schematic side view of the downwind type wind turbine to which the present invention is applied.

Referring to FIG. 25 showing the 14$^{th}$ embodiment, the blade tilting mechanism, which is a modification of the blade tilting mechanism of FIG. 23, 24, is composed as follows. In the drawing, the same part as that of FIG. 23, 24 is marked with the same reference numeral.

Reference numeral 410 is a servomotor fixed to the rotor head 350, the output shaft 411 of the servomotor 410 has a male screw thread part 412 with which the female screw thread of a blade link guide 413 is engaged. The blade link guide 413 has protruded portions in each of which a groove is defined for receiving each of rollers 405 which is fit for rotation to each of pins 404 fixed to the other end part of each of the blade links 4103. The construction other than mentioned above is the same as that of FIG. 23, 24 of the 13$^{th}$ embodiment.

With this construction, the blade tilt angle θ can be changed by the reciprocation of the blade link guide 413 by the rotation of the output shaft 411 of the servomotor 410 rotating the servomotor 410.

Referring to FIG. 15 of the 15$^{th}$ embodiment, the blade tilting mechanism is composed as follows.

Two blade links 4103 to each of which is fixed the blade 100 are attached for swinging to the rotor head 350 via supporting shafts 432 at the front end near the periphery of the rotor head 350. Reference numeral 435 is a bracket fixed to the rotor head at the front end thereof. A hydraulic cylinder 430 is attached supported via a hydraulic cylinder supporting shaft 434 and a pin 433 between the end part of the bracket 435 and the middle part of each of the blade links 4103.

The tilt angle, or spread angle θ, of the blades 100 can be changed by the movement of the rod 431 of the hydraulic cylinder 430. The construction other than mentioned above is the same as that of FIG. 23, 24 of the 13$^{th}$ embodiment, and the same as that of FIG. 23, 24 is marked with the same reference numeral.

With the 15$^{th}$ embodiment, the active annular plane area is changeable by changing the spread angle θ of the blades to adjust active annular plane area so that the wind turbine is operated under the optimal condition taking fatigue failure in the rotating components into consideration.

As has been described in the foregoing, according to the present invention, the blades are moved in radially outward directions to increase the active annular plane area as detected wind speed decreases, and the blades are moved in radially inward directions to decrease active annular plane area as detected wind speed increases. By controlling the radial position of the blades like this, the wind turbine can be operated so that the output as high as possible is obtained while evading the occurrence of fatigue failure of the rotating components such as the blades and rotor under the present wind speed.

Therefore, the wind turbine can be operated while always automatically controlling blade length so that the occurrence of fatigue failure of the rotating components such as the blades and rotor, and at the same time the wind turbine is operated with the optimal active annular plane area which ensures the maximum output of the wind turbine within the range capable of evading the fatigue failure. Accordingly, the operation of the wind turbine is possible with an optimal maximum output with elongated fatigue life of the rotating elements such as the blades and rotor.

According to the present invention, the active annular plane area can be adjusted to an optimal area in correspondence with wind conditions even in the operation of the wind turbine by changing the effective blade length through changing tip diameter of blades by moving the blades in the radial direction of the rotor via the blade length varying mechanism.

By this adjustment, the operation of the wind turbine can be performed so that the output is the maximum within the condition capable of evading the occurrence of fatigue failure of the rotating components such as the blades and rotor.

Therefore, the wind turbine can be operated while always automatically controlling blade length so that the occurrence of fatigue failure of the rotating components such as the blades and rotor, and at the same time the wind turbine is operated with the optimal active annular plane area which ensures the maximum output of the wind turbine within the range capable of evading the fatigue failure. Accordingly, the operation of the wind turbine is possible with an optimal maximum output with elongated fatigue life of the rotating elements such as the blades and rotor.

Further, the blade length varying mechanism is constructed light in weight and can be provided inside the blade, so the active annular plane area is variable without accompanying the increase in the weight of blade.

Further, according to the present invention, the active annular plane area can be controlled so that the wind turbine is always operated with an optimal output level by controlling the active annular plane area so that the area is optimal for the wind turbine operating conditions such as wind speed, rotation speed and load of the wind turbine through the blade length control device. Therefore, the action of an excessively high stress on the rotating components of the wind turbine due to a rapid increase in wind speed or load is suppressed resulting in the prevention of fatigue failure of the rotating components.

Therefore, the wind turbine can be operated while always automatically controlling blade length so that the occurrence of fatigue failure of the rotating components such as the blades and rotor and at the same time with the optimal active annular plane area which insures a maximum of the wind turbine output within the range capable of evading the fatigue failure. Accordingly, the operation of wind turbine is possible with an optimal maximum output with elongated fatigue life of the rotating elements such as the blades and rotor.

Further, according to the present invention, the problem that may occur with conventional wind turbines having no adjusting means for the adjusting active annular plane area, i.e., the occurrence of fatigue failure of the rotating components such as the blade and rotor due to excessive high speed wind sometimes experienced by a gust of wind is prevented, and the wind turbine can be operated with a maximum output within the range of evading the occurrence of fatigue failure of the rotating components such as the blades and rotor by tilting the blades through changing the rotation angle of each connecting elbow according to the speed of the wind acting on the blades.

Therefore, the wind turbine can be operated while always automatically controlling blade length so that the occurrence of fatigue failure of the rotating components such as the blades and rotor and at the same time with the optimal active annular plane area which insures a maximum of the wind turbine output while avoiding the fatigue failure. Accordingly, the operation of wind turbine is possible with an optimal maximum output with elongated fatigue life of the rotating elements such as the blades and rotor. Thus, the problem of fatigue failure due to excess wind speed of a gust of wind is prevented.

Further, by changing the distance from the axis of rotation of the connecting elbow to the end face thereof for attaching the blade, the tip diameter of the blade can be changed, so that active annular plane area can be changed by preparing several connecting elbows different in said distance and only changing the connecting elbow without preparing blades of different blade length.

Further, according to the present invention, by adjusting the active annular plane area through changing the tilt angle of blade responding to the detected speed of the wind acting on the blades, the wind turbine is operated with an optimal maximum output within the range of evading the occurrence of fatigue failure in the components such as blades and rotor.

Therefore, the wind turbine can be operated while always automatically controlling blade length so that the occurrence of fatigue failure of the rotating components such as the blades and rotor and at the same time with the optimal active annular plane area which insures a maximum of the wind turbine output while avoiding the fatigue failure. Accordingly, the operation of wind turbine is possible with an optimal maximum output with elongated fatigue life of the rotating elements such as the blades and rotor.

What is claimed is:

1. The wind turbine with an active annular plane area control mechanism, comprising a plurality of blades attached to a rotor head for transmitting the wind force acting on the blades to the output shaft of the wind turbine connected to the rotor head, wherein are provided a blade tilting mechanism for tilting the blades in the direction of the axis of rotation of the rotor head to change active annular plane angle, and wherein said blade tilting mechanism comprises a fluid pressure actuators fixed to the rotor head so that the output shaft thereof moves in the direction of the axis of rotation of the rotor head, and a plurality of blade link each of which is supported via the supporting shaft fixed to the rotor head for swinging, an end part of each link being connected to the output shaft of said fluid pressure actuator and the other end being connected to each blade, and the tilt angle of the blades can be changed by swinging said blade link around said supporting shaft through the reciprocation of the output shaft of said fluid pressure actuator.

2. A wind turbine with an active annular plane area control mechanism, comprising a plurality of blades attached to a rotor head for transmitting the wind force acting on the blades to the output shaft of the wind turbine connected to the rotor head, wherein are provided a blade tilting mechanism for tilting the blades in the direction of the axis of rotation of the rotor head to change active annular plane angle, and wherein said blade tilting mechanism comprises a servomotor fixed to the rotor head and having an output shaft having a male screw thread part, and a plurality of blade links each of which is supported via the supporting shaft fixed to the rotor head for swinging, an end part of each link being connected to a blade link guide engaged with the male screw thread of the output shaft of said servomotor, the other end being connected to each blade, and the tilt angle of the blades can be changed by swinging said blade link around said supporting shaft through the rotation of the output shaft of said servomotor.

3. A wind turbine with an active annular plane area control mechanism, comprising a plurality of blades attached to a rotor head for transmitting the wind force acting on the blades to the output shaft of the wind turbine connected to the rotor head, wherein are provided a blade tilting mechanism for tilting the blades in the direction of the axis of rotation of the rotor head to change active annular plane angle, and wherein said blade tilting mechanism comprises a plurality of blade links each of which is supported via the supporting shaft fixed to the rotor head for swinging, and fluid pressure actuators each bridging between the protrusion extending from the center of the end of the rotor head and each blade link for changing the blade tilt angle in the direction of the axis of rotation of the rotor head by the extension and contraction of said actuator.

* * * * *